(12) United States Patent
Furukawa et al.

(10) Patent No.: US 8,331,744 B2
(45) Date of Patent: Dec. 11, 2012

(54) OPTICAL SWITCH

(75) Inventors: Hiroyuki Furukawa, Kawasaki (JP); Nobuhiro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1234 days.

(21) Appl. No.: 11/940,476

(22) Filed: Nov. 15, 2007

(65) Prior Publication Data
US 2010/0284648 A1 Nov. 11, 2010

(30) Foreign Application Priority Data
Nov. 30, 2006 (JP) ................. 2006-324418

(51) Int. Cl.
G02B 6/26 (2006.01)
G02B 6/42 (2006.01)
G02B 5/30 (2006.01)
G02B 27/28 (2006.01)
G02F 1/29 (2006.01)
H04B 10/08 (2006.01)
H04B 17/00 (2006.01)
H04J 14/00 (2006.01)

(52) U.S. Cl. ............... 385/18; 398/12; 398/19; 398/45; 359/320; 359/484.06

(58) Field of Classification Search .............. 385/18, 385/16; 398/12, 19, 45; 359/320, 484.06
See application file for complete search history.

(56) References Cited

U.S. PATENT DOCUMENTS

| 6,661,948 B2 | 12/2003 | Wilde et al. |
| RE39,525 E | 3/2007 | Wilde et al. |
| 2006/0222290 A1 * | 10/2006 | Yamashita et al. ............. 385/18 |

FOREIGN PATENT DOCUMENTS

| JP | 2-24635 | 1/1990 |
| JP | 2003-215645 | 7/2003 |
| JP | 2006-276487 | 10/2006 |

* cited by examiner

*Primary Examiner* — Jerry Blevins
(74) *Attorney, Agent, or Firm* — Staas & Halsey LLP

(57) ABSTRACT

The optical switch is capable of supervising the performance of optical switching in standby channels, and includes: a collimator unit; an optical splitter; a light-gathering unit; and a rotatable mirror. The optical switch further includes: a mirror angle controlling unit which controls a reflection face angle of the rotatable mirror for each wavelength to switch ON/OFF of the light beam coupling to the optical output port for each wavelength reflected, and determines an optical output port position outputting light beams of the reflected wavelengths; and a monitor unit, installed on a return path of a light beam, which monitors a light beam whose optical coupling is made OFF.

15 Claims, 21 Drawing Sheets

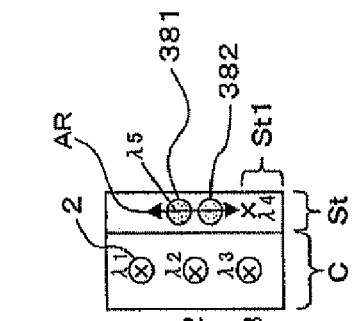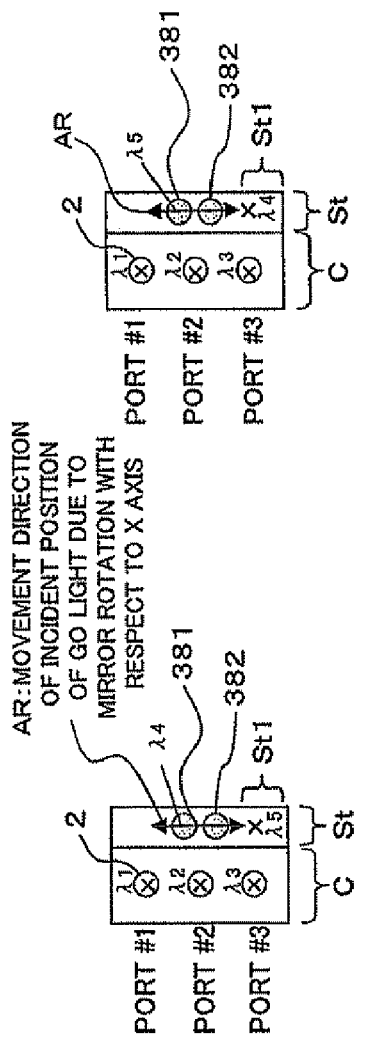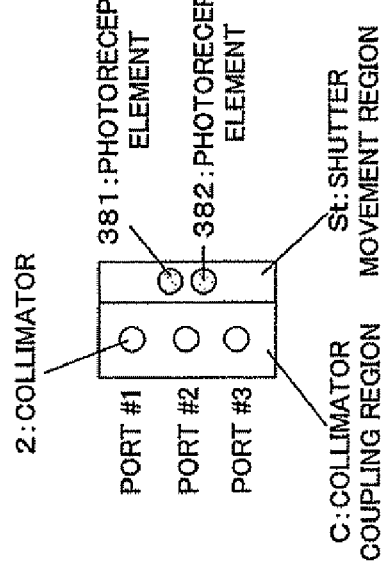

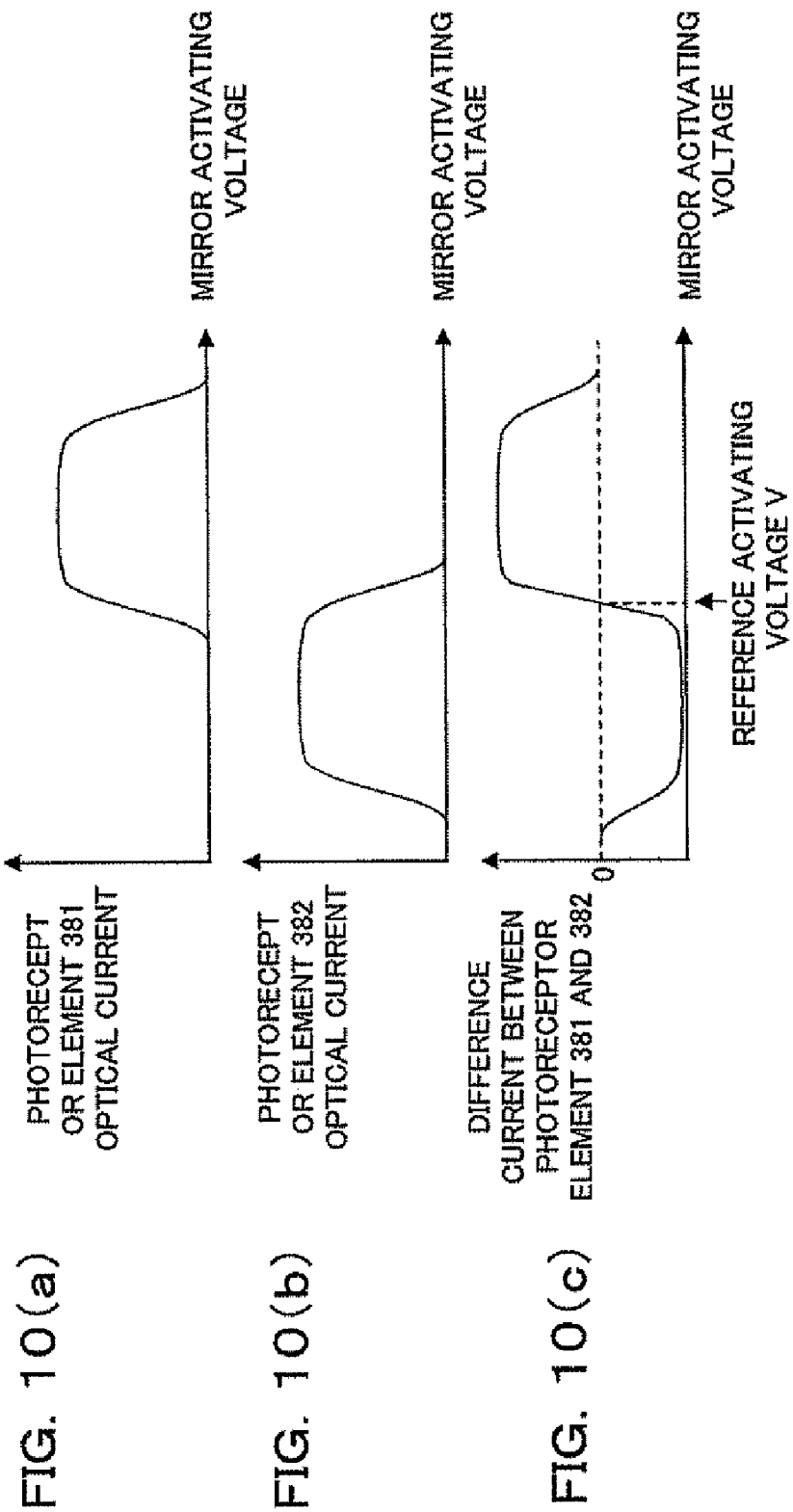

OPTICAL SWITCH

BACKGROUND OF THE INVENTION

1) Field of the Invention

The present invention relates to an optical switch, and in particular, the invention relates to an optical switch suitable for use as a wavelength-selective switch applied to an optical add/drop unit in a optical communication system.

2) Description of the Related Art

Recently, due to flexibility and high redundancy of communication networks, wavelength multiplex OADM (Optical Add Drop Multiplexer) devices are increasingly introduced commercially. Wavelength multiplex OADM devices require a function of switches freely arbitrary wavelengths to arbitrary paths in a network having a form of a ring or the like.

In particular, since a high-speed redundant function, such as switching a path at the time of break of a transmission path fiber, influences the reliability of the whole system, not only switching speed but also accuracy is necessary.

FIG. 19 shows an example of a construction of wavelength multiplex OADM node. A wavelength multiplex OADM (OADM device) 100 includes: a pre-amplifier 101; a splitter unit 102 which splits light from the pre-amplifier 101 into two; an wavelength-selective optical switch 103 for dropping which selectively drops light of an arbitrary wavelength channel of one of the light beams having been split by the splitter unit 102; an wavelength-selective optical switch 104 for adding which inserts light of a wavelength channel for add of the other light beam having been split by the splitter unit 102; and a post-amplifier 105.

Further, as shown in FIG. 19, the wavelength-selective switches 103 and 104, which are for drop and add, respectively, are constructed in such a manner that multiple wavelength-selective optical switches in a cascade form. Accordingly, since the wavelength multiplex OADM 100 having the construction shown in FIG. 19 has advantages that the load, such as work of adding of channels corresponding to the number of wavelengths and port connection work, etc., is small, it is considered that it will become one of the main streams of node constructions in wavelength multiplexing optical transmission systems from then on.

FIG. 20 and FIG. 21 show examples of an abbreviated construction of the wavelength selective optical switch 110 (103 and 104) for use in add and drop in the above-described wavelength multiplex OADM 100. FIG. 20 is an upper view of the diagrammatic construction of the wavelength-selective optical switch 110 (103 and 104) which is used for add and drop, and FIG. 21 is an front view. Here, the wavelength-selective optical switch 110 includes: collimators 111 which attempt to performing optical coupling between input and output optical fiber, which function as transmission paths; an optical splitter element 112 which splits parallel light from the collimator 111; a light-gathering lens 113; and a movable mirror array 114. Here, although the construction example shows that the input port 1 corresponds to the output port 2, input and output paths can be inverted and the output port 1 can correspond to the input port 2.

In the movable mirror array 114, mirror devices 114a are arranged in a form of an array (here, one row along with the X axis) so that reflection surface angles with respect to the X axis are individually set for mirror light (here, λ1 through λ5) split by the optical splitter element 112. In this instance, each mirror device 114a is supported in such a manner that it is individually rotatable with respect to the X axis and the Y axis. By means of a force received from a non-illustrated mechanism supplying physical external forces, such as mechanical, opto-electrical, or opto-magnetical effect, it is possible to individually set the reflect surface angles with respect to the X axis and the Y axis.

That is, by means of adjusting the reflection surface angle with respect to the X axis for each wavelength of the movable mirror array 114 of the light input through the collimator 111-1 in FIG. 21, it becomes possible to introduce reflected light to an output optical fiber through an arbitrary one of the two collimators 111-2 and 111-3. Hereby, a function of wavelength-selective switch which switches light input through an input 1 port to an output 2 port according to the wavelength channels, are realized. In this manner, the movable mirror arrays 114 of the number of wavelengths necessary for the optical transmission system are arranged, and each is adapted to individually moved.

Like the wavelength multiplex OADM 100 in FIG. 19, an ODAM device using a wavelength selective switch is designed to be upgraded to have several tens of channels in consideration to increase in traffic in future in the optical transmission system. Normally, when the system is initially introduced, service generally starts with a small number of channels. In this case, the number of channels not in operation is relatively large.

Such standby channels not in operation, that is, not in service are shuttered in a shutter movement region in an optical switch to remove natural radiation light (ASE light) by an optical amplifier arranged in an optical transmission path, and to prevent the occurrences of optical surges in an optical amplifier due to abrupt light input. More specifically, as shown in FIG. 22, the reflect surface angles of the mirror devices 114a can be set with respect to not only the X axis but the Y axis. Thus, light in channels not in operation is introduced to a region St (Shutter movement region) which is deviated from a region optically coupled to the collimators 111-2 and 111-3 which are output destination (see return light indicated by the broken line in FIG. 22).

In this instance, as technology relating to wavelength-selective optical switches, the following patent documents 1 and 2, for example, exist. In addition, as technology relating to the present invention, the following patent documents 3 and 4 exist.

[Patent Document 1] U.S. Pat. No. 6,661,948
[Patent Document 2] Japanese Patent Application Laid-Open No. 2006-276487
[Patent Document 3] Japanese Patent Application Laid-Open No. 2003-215645
[Patent Document 4] Japanese Patent Application Laid-Open No. HEI 2-024635

The reflection surface angle of the movable mirror array 114 included in the above-described optical switch 110 shown in the above-described FIG. 20 and FIG. 21, is variably changed in response to a physical external force such as mechanical, opto-electrical, or opto-magnetic one, and there exists a certain disorder occurrence rate. On the other hand, when the optical switch 110 is applied to the above-described wavelength multiplex OADM 100 or the like, the above-described redundant operation such as path switching is performed. At that time, standby optical ports and wavelength channels need to be switched in high-speed at the time of occurrence of disorder.

Hence, when a wavelength-selective optical switch is applied to a wavelength multiplex OADM device 100 or the like, as preventive measures at the time of the above-mentioned occurrence of disorder, the optical switch itself is desirable to supervise that it has sufficient switching ability even during standby (that is, at the time not in operation), and also to always perform detect ion of disorders.

However, in the optical switch 110 shown in FIG. 20 and FIG. 21, as shown in FIG. 22, as to light of wavelength channels not in operation is not positively coupled to the collimators 111-2 and 111-3, which are output destination, and thus, the optical switch 110 never output an optical signal outside the optical switch. In consequence, there is an issue that it is impossible to observe from outside the presence and the absence of input of a signal light of standby channels, disorder of standby channels, deterioration of the movable mirror array 114 or the like.

None of the above patent documents 1 through 4 does not disclose technology for supervising the performance of optical switching in the above-described standby channels.

SUMMARY OF THE INVENTION

With the foregoing problems in view, one object of the present invention is to make it possible to supervise the performance of optical switching in the standby channels or to detect disorder of optical switch constructions.

Another object of the invention is to monitor standby light of a wavelength not to be output for the purpose of improving the usefulness as an optical switch.

In order to accomplish the above objects, according to the present invention, there is provided an optical switch having the following features.

(1) As a generic feature, there is provided an optical switch adapted to switch an optical path of a light beam from m (m is a natural number) optical input port to n (n is a natural number) optical output port(s) by the unit of wavelength. The optical switch comprises: a collimator unit which makes the light from the optical input port parallel light; an optical splitter which splits the light from the collimator unit; a light gathering unit which gathers the light beams, which have been split by the optical splitter, for each wavelength; a rotatable mirror which is installed to individually reflect light beams of individual wavelengths, which have been gathered by the light-gathering unit, and whose reflect surface angle is set by rotation. The collimator, the optical splitter, the focusing unit, and the rotatable mirror form a round optical path between the optical input port and the optical output port. The optical switch further comprises a mirror angle control unit which controls a reflection surface angle of the rotatable mirror for each wavelength to switch ON/OFF of the light beam coupling to the optical output port for each wavelength reflected, and determine an optical output port position outputting light beams of the reflected wavelengths; and a monitor unit, installed on a return path of a light beam, which makes the optical coupling to the output port OFF.

(2) As a preferred feature, in the above (1), the rotatable mirror has a plurality of rotation axes, and the mirror angle controlling unit controls an angle of one of the rotation axes for the rotatable mirrors for each light beam, and switches ON/OFF of optical coupling to an optical port of the light beams of wavelengths reflected, the mirror angle controlling unit controlling an angle of one of the other axis of the rotatable mirror for each wavelength of the light beam, and determines optical output port positions to which the light beams of each wavelength reflected are output.

(3) As another preferred feature, in the above (2), the mirror angle controlling unit includes: a movement operation giving unit which gives a cyclic movement of an angle of the one or said the other rotation axis so that an orbit of a light beam of a wavelength at which optical coupling to the optical output port is made OFF; and a supervisory unit which supervises the movement state of a rotatable mirror which reflects a light beam of the wavelength whose optical coupling to the optical output port is made OFF based on the amplitude or the frequency monitored by the monitoring unit due to a movement operation given by the movement operation giving unit.

(4) As yet another preferred feature, in the above (2), the mirror angle controlling unit includes: a movement operation giving unit which moves the angle of said the one or said the other one of mirrors with respect to said the one or said the other rotation angle, so that the orbit of the light beam whose optical coupling to the output port is made OFF is moved; and the monitor unit includes: a photoreceptor element pair made of two photoreceptor elements arranged so that the sensitivities of each photoreceptor element partially overlap along the movement direction of the orbit of a light beam which is given from the movement operation giving unit. The optical switch further comprises a monitoring unit, which detects an amount of control by the mirror angle controlling unit, when the reception sensitivity overlaps the reception sensitivity with movement operation given by the movement operation giving unit, and which monitors the operation state of the rotatable mirror for a light beam of a wavelength whose optical coupling to the optical output port is made OFF.

(5) As still another preferred feature, in the above (3), when a plurality of wavelengths whose optical coupling is to be OFF exist, the movement operation giving unit moves the angle of a rotatable mirror with respect to one wavelength, out of the plurality of wavelengths to be supervised is moved, and the supervisory unit performs the above mentioned supervisory, and the movement giving unit and the operation monitoring unit sequentially switches the rotatable mirrors with respect to a wavelength to be monitored.

(6) As a further preferred feature, in the above (3), the monitoring unit includes a plurality of photoreception elements arranged in parallel in the optical output port.

(7) As a yet further preferred feature, the monitoring unit includes the number of photoreception elements corresponding to the number of optical output ports.

(8) As a still further preferred feature, the monitoring unit includes the number of photoreception elements corresponding to the number of wavelengths which are arranged in parallel in the optical output port, to which the output destination is switchable.

(9) As another preferred feature, in the above (6), when a plurality of wavelengths whose optical coupling is to be OFF, the movement operation giving unit and the supervisory unit individually associate the rotatable mirrors of the plurality of wavelengths to be supervised with the photoreceptor elements, thereby supervising the movement state of rotatable mirrors of a plurality of wavelengths, and sequentially switch the association of the rotatable mirrors of the plurality of wavelengths with the photoreceptor element.

(10) As yet another preferred feature, in the above (4), in the monitoring unit, a plurality of photoreceptor element pairs, each composed of two receptor elements, are arranged in parallel with the optical output port.

(11) As still another preferred feature, in the above (4), in the monitoring unit, photoreceptor element pairs, each composed of two photoreceptor elements, are arranged in parallel with the optical output port, the number of photoreceptor element pairs being arranged corresponding to the number of optical output ports.

(12) As a further preferred feature, in the above (4), in the monitoring unit, reception element pairs, each composed of two photoreceptor elements, are arranged in parallel in the optical port, and the number of the above photoreceptor elements corresponds to the number of wavelengths whose output destination is switchable.

(13) As a yet further preferred feature, in the above (2), the mirror angle controlling unit includes a movement operation giving unit which individually moves an angle of said the one of or said the other of light beam so that the orbit of the light beam whose optical coupling to the optical port is made to be OFF, and the monitoring unit includes at least three photoreception element pairs arranged so that the reception sensitivities partially overlap in the at least two directions of the orbit of an optical beam given by the movement operation giving unit, and the supervisory unit specifies a light beam position at which the reception sensitivities overlap along with a movement operation given by the movement operation giving unit, and individually supervises an operation state of said the one and said the other rotation axis in a rotation mirror which reflects a light beam of the wavelength whose optical coupling is made to be OFF, on the basis of the amount of controlling at the mirror angle controlling unit.

(14) As a still further preferred feature, in the above (13), the monitor unit includes at least three photoreception element groups arranged in parallel in the optical port.

(15) As another preferred feature, in the above (13), in the monitoring unit, a plurality of photoreceptor element groups, each made of at least three photoreceptor elements, are arranged in parallel in the optical output port in the number corresponding to the number of optical output ports.

(16) As yet another preferred feature, in the above (13), in the monitoring unit, a plurality of photoreceptor element groups, each made of at least three receptor elements, are arranged in the number corresponding to the number of wavelengths whose output destination is switchable.

(17) As yet another preferred feature, in the above (10), when a plurality of wavelengths whose optical coupling are made to be OFF, the movement operation giving unit and the supervisory unit associate rotation mirrors with the photoreception element groups individually, thereby supervising the state of rotatable mirrors at a plurality of wavelengths, while by means of associating rotatable mirrors and the photoreceptor element individually, the movement operation giving unit and the supervisory unit sequentially switch the association of the rotatable mirrors of the plurality wavelengths to be supervised with photoreceptor element.

(18) As still another preferred feature, in the above (1), the mirror angle controlling unit controls the angle of the rotatable mirror so that the mirror angle controlling unit makes optical coupling ON about an optical beam of the wavelength in operation, and makes optical coupling OFF about an optical beam of the wavelength not in operation including natural radiation light, and the monitoring unit monitors light beams whose optical coupling is made OFF of wavelengths not in use including the natural radiation light, and in the optical switch comprises a supervisory unit which supervises the movement state of the rotatable mirror, to which a light beam of the wavelength not in operation is reflected.

(19) As a further preferred feature, in the above (18), an optical amplifier which amplifies an input signal light together with natural radiation light is arranged before the optical input port.

(20) As a yet further preferred feature, in the above (1), a light input signal whose optical coupling to the optical output port is made OFF is detected based on the monitoring result by the monitoring unit.

In this manner, since the monitor unit is capable of monitoring light in standby channels, which could not be previously monitored, the present invention is advantageous in that the usefulness as an optical switch is improved.

Further, since the performance of switching is supervised, the present invention is advantageous in that the reliability in operation is improved.

Other objects and further features of the present invention will be apparent from the following detailed description when read in conjunction with the accompanying drawings.

BRIEF DESCRIPTION OF THE DRAWINGS

FIG. 9(a) through FIG. 9(c) each are diagrams for describing important constructions and operations of the optical switch according to the second embodiment;

FIG. 10(a) through FIG. 10(c) each are diagrams for describing an operation of an optical switch according to the second embodiment;

DESCRIPTION OF THE PREFERRED EMBODIMENT(S)

Figure 1:
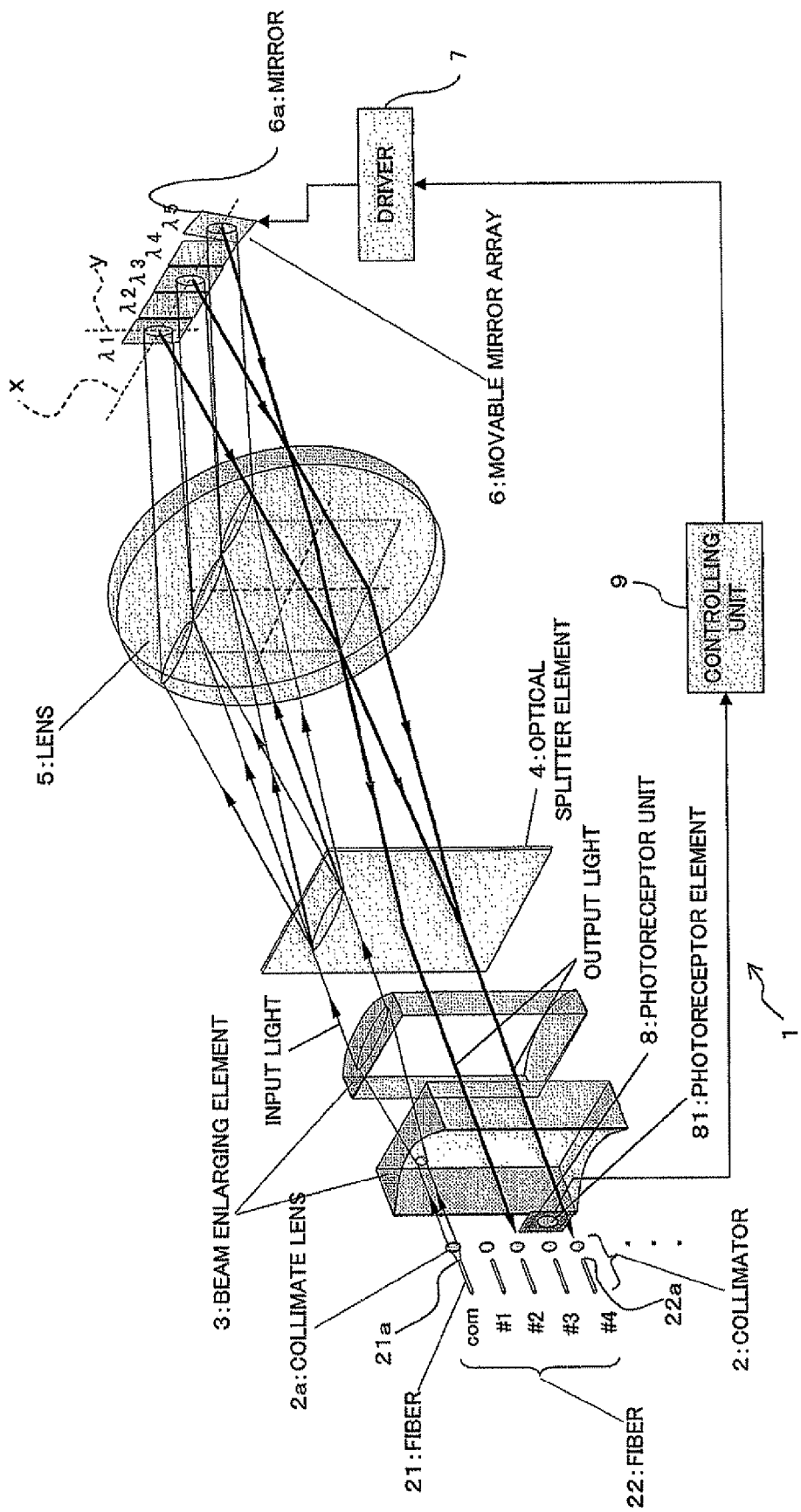
FIG. 1 is a diagrammatic perspective view showing an optical switch according to a first embodiment of the present invention.

Referring to the drawings, a description will be made hereinafter of preferred embodiments of the present invention.

In this instance, the present invention should by no means be limited to the following embodiments. Further, in addition of objects of the above-described invention, other technological problems, and means for solving such technological problems and effects and befits are cleared by the description of the following embodiments.

[A] First Embodiment

Figure 2:
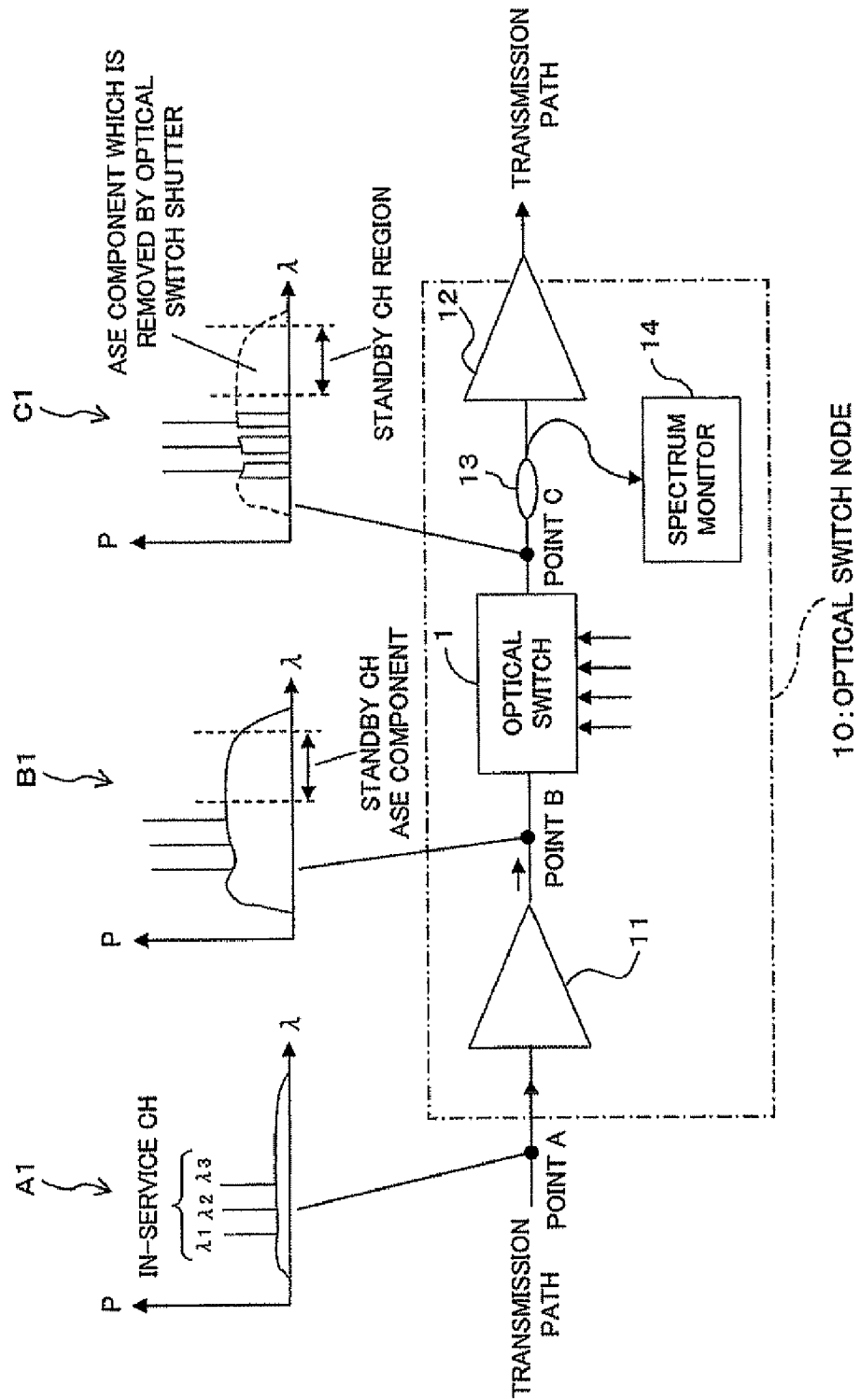
FIG. 2 is a diagram showing an optical switching node to which an optical switch of the first embodiment is applied.
Figure 3:
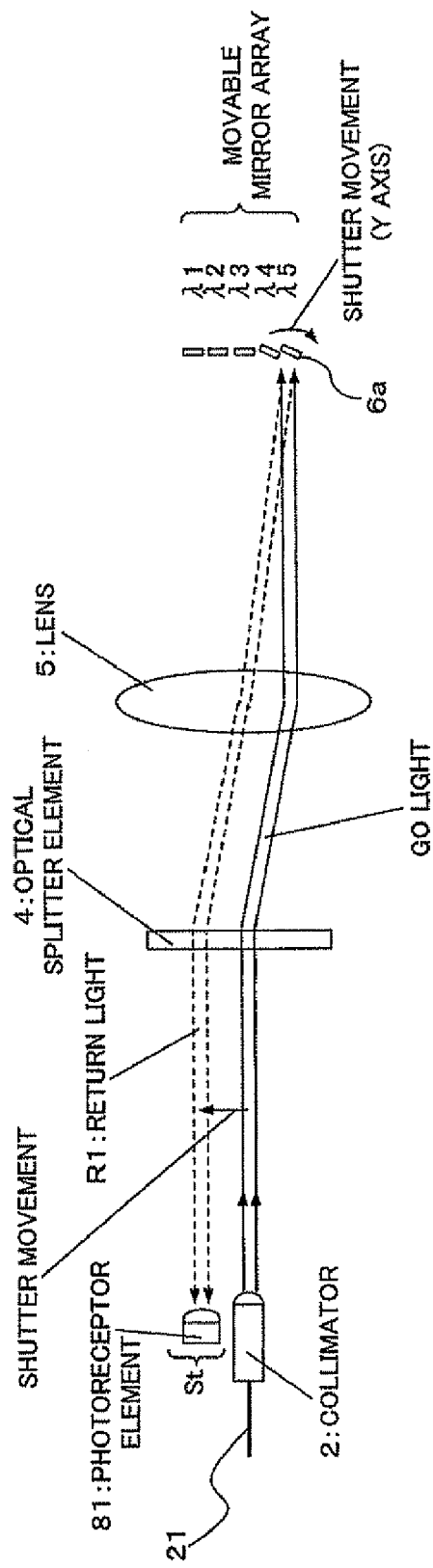
FIG. 3, FIG. 4, FIG. 5(a) through FIG. 5(c), and FIG. 6(a) through FIG. 6(e) each are diagrams for describing important constructions and operations of the optical switch according to the first embodiment.

FIG. 1 is a diagrammatic perspective view showing a wavelength-selective type optical switch 1 according to the first embodiment. The optical switch 1 is applied to, for example, an optical switch node 10 arranged on an optical transmission path as shown in FIG. 2. This optical switch node 10 has an optical switch 1 according to the first embodiment, a pre-amplifier 11 on the upstream side of the optical switch 1, and a post-amplifier 12 on the downstream side of the optical switch 1. In this instance, reference character 13 indicates a splitter which takes out a part of a light signal output from the optical switch 1, and reference character 14 indicates a spectrum monitor which performs spectrum analysis of an output of the optical switch 1 based on an optical signal taken out by the splitter 13.

Here, a light signal propagated through the transmission path and attenuated is amplified by a pre-amplifier 11 of the optical switch node 10. Here, when an arrangement of the wavelength channel in operation (in-service) is three channels of λ1 through λ3, the optical spectrum of a light signal at the time point at which the light signal is input to the pre-amplifier 11 (see point A in FIG. 2) is as shown as A1 in FIG. 2. The optical spectrum of a light signal at the time point at which the light signal is output from the pre-amplifier 11 (see point B in FIG. 2) is as shown as B1 in FIG. 2. That is, not only light of signal light wavelength band λ1 through λ3 but also natural radiation light ("standby ch ASE component") including a wavelength component of the standby channel is optically amplified.

Figure 22:
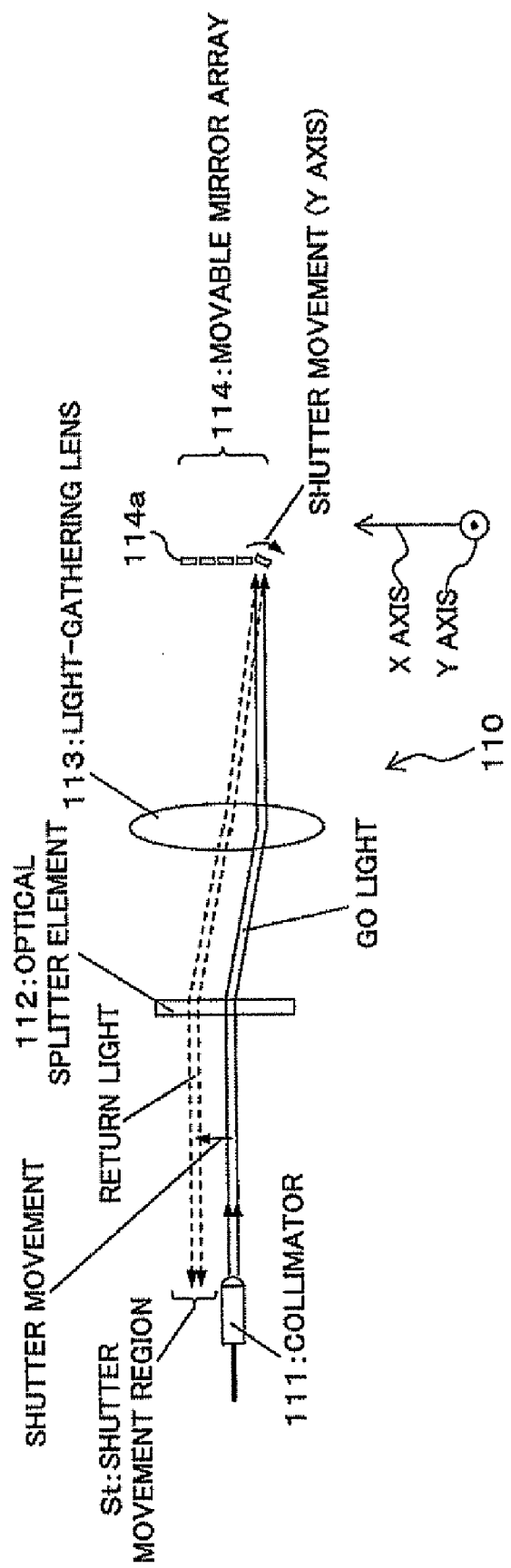
FIG. 22 is a diagram showing previous technology.

Then, when an amplified light signal, amplified by the pre-amplifier 11, is input to the optical switch 1, the optical switch 1 performs shielding processing to an optical component of the standby channel as shown in FIG. 22. As a result, the optical spectrum at the optical switch 1 (see point C in FIG. 2) becomes as shown by C1 of FIG. 2. That is, a standby channel component is removed (an "ASE component which is removed by the optical switch shutter"), and wavelength band spectrum of the in-service channels of λ1 through λ3 only pass through. After that, an optical signal output from the optical switch 1 is amplified by the post-amplifier 12, and then output to the transmission path.

Further, the optical switch 1 is capable of switching light beams from m (m is a natural number) light ports into n (n is a natural number) by the unit of wavelength. In particular, in FIG. 1, light output ports for one input port is set to be m1 (m1 is a natural number greater than four).

In addition, an input optical fiber 21 having an end surface 21a which is an optical input port and an output optical fiber 22 having an optical output port 22a are arranged so that end surfaces 21a and 22a face in the same direction. The optical switch 1, with respect to light of wavelength channel in-service, introduces light radiated from the end surface 21a to an output optical fiber 22 to which light should be output. On the other hand, with respect to light of wavelength (standby), it can be removed at a output stage as described above. At that time, in the optical switch 1 of the first embodiment, it is possible to monitor a standby channel component to be removed at the output stage.

For this purpose, the optical switch 1 has a collimator 2, a beam enlarging element 3, an optical splitter element 4, a lens 5, and a movable mirror array 6. In addition, a go and return optical path is installed between the end surface 21a of the end portion 21a of the input fiber 21 which serves as an optical input port and the end portion 22a of the output optical fiber 22 which serves as an optical output port. Further, the optical switch 1 has a driver 7 which activates the movable mirror array 6, a monitor unit (photoreceptor element unit) 8, and a controlling unit 9.

Here, the collimator 2 outputs light of the "go" path from the above-described input optical fiber 21 to the beam enlarging element 3 at a later stage as collimate light, and couples collimate light of an in-service channel from the beam enlarging element 3. Together with the input and output optical fibers 21 and 22, there is provided a collimate lens 2a arranged on an optical axis between the optical fibers 21 and 22 and the beam enlarging element 3.

Further, the beam enlarging element 3 outputs collimate light through the go optical path from the collimator 2 to the optical splitter element 4 as light having a beam shape spreading in the X axis direction in FIG. 1. In addition, the beam enlarging element 3 outputs light through the return path from the optical splitter element 4 as collimate light whose width is reduced, which light has been spread in the X direction. The beam enlarging element 3 is made of a pair of lenses as shown in FIG. 1. Accordingly, the above-described collimator 2 and the beam enlarging element 3 construct a collimate unit which makes light from the light input port into collimate light.

Further, the optical splitter element 4 splits the collimate light through the go path from the beam enlarging element 3, and for each wavelength channel component, radiates to the lens 5 at different angles (spreading in the X axis in the drawing). In addition, the optical splitter element 4 radiates light through the return path from the lens 5 to the beam enlarging element 3 at different angles for each wavelength channel. Accordingly, the optical splitter element 4 is a light splitter unit which splits light from the collimator unit.

In addition, the lens 5 converts all the light beams which incident at different wavelengths for each light wavelength into collimate light beams, and light of each wavelength channel is input at a focus of different mirrors 6a making the movable mirror array 6. Further, light on the return path reflected by the mirror 6a, which constructs movable mirror array 6, is output to the optical splitter element 4. Accordingly, the lens 5 serves as a light-gathering unit which collects light for each light beams, split by the splitter, for each wavelength.

In addition, the movable mirror array 6 is made of mirror 6a arranged in the X axis at the position of focus point of the lens 5 (corresponding to light-splitting by the optical splitter element 4). Each mirror 6a individually reflects light of the wavelength channels (λ1 through λ5) split by the optical splitter element 4. In addition, its reflect surface is rotatable with respect to the X axis and the Y axis. As a result, it is possible to set the reflection face angle independently with respect to the X axis and the Y axis. In other words, mirror 6a making the movable mirror array 6 are rotatable mirrors having multiple rotation axes arranged for individually reflecting light beams of different wavelengths focused by the focusing unit.

Here, the each mirror 6a making the movable mirror array 6 is capable of determining an output optical fiber 22 to which coupling is performed by setting the tilt angle θx with respect to the X axis. That is, if the rotation control amount with respect to the Y axis is 0 degree, the light reflected by the mirror 6a is coupled to the output optical fiber 22 which depends on the X axis angle of the mirror 6a by way of the lens 5, the optical splitter element 4, the beam enlarging element 3, and the collimator 2.

On the other hand, in each mirror 6a making the movable mirror array 6, the reflect face angle θy with respect to the Y axis is tilted, and hereby the light reflected by the mirror 6a is radiated to the shutter operation region, in which photoreceptor element 81 making the monitor unit 8 is arranged, and deviated from the optical path to the collimator 2, which is coupled to the output optical fiber 22, through the lens 5, the optical splitter element 4, the beam enlarging element 3.

Hence, in the optical switch 1 which is applied to the optical switch node 10, light of in-service wavelength channel is coupled to the output optical fiber 22 with the reflection angle θy being substantially 0 degree. On the other hand, light of the standby wavelength channel is controlled to rotate so that the reflection surface angle θy is tilted with respect to the Y axis, by means of an shutter operation, as shown in return path light R1. As a result, the standby light is radiated to a shutter operation region St in which photodiode 81 is arranged. In this instance, by means of adjusting the above-mentioned θx and θy, it is possible that the optical level to be coupled to the output optical fiber 22 is attenuated to a target level having been set.

Further, the driver 7 is subjected to driving control by the control unit 9 (described later). To individually adjust the reflection surface angle with the X axis and the Y axis of each mirror 6a making the movable mirror array 6, the driver 7 activates the movable mirror array 6. That is, by means of external forces generated by activation of the movable mirror array 6 by the driver 7, each mirror 6a is tilted by the angle having been set.

In addition, the monitoring unit 8 is arranged on the return path of a light beam whose optical coupling to the optical output port is made to be OFF, and monitors a light beam whose optical coupling to the optical output port is made to be OFF. For example, the collimator 2 is made of photodiode 81, as a photoreceptor element which outputs an electric signal corresponding to the light reception amount.

Further, when connection relationship of the output optical fiber 22 to input optical fiber 21 is set with respect to wavelength channel in service, for the purpose of performing the required switching, the controlling unit 9 performs activating control to the driver 7. On the other hand, as to light of standby channel to which the relationship of the input optical fiber 21 to the output optical fiber 22 is not set, the driver 7 is activated to radiate the light to the shutter operation region St.

Accordingly, the above-described controlling unit 9 cooperates with the driver 7, thereby controlling a light beam which is reflected with respect to the Y axis, as one rotation axis of the mirror 6a, and switches ON/OFF of the optical coupling to the optical output port for the light beam for each reflected wavelength, and controls an angle of the X axis, as the other rotation axis, with respect to the X axis which is another rotation axis of the mirror 6a, and constructs a mirror angle controlling unit which determines the optical output port positions from which light beams of the reflected wavelengths are output.

That is, the controlling unit 9, which serves as a mirror angel controlling unit, makes optical coupling ON with respect to the light beam of a signal light wavelength in service. On the other hand, as to a light beam of the signal wavelengths out-of-service including natural radiation light, the mirror 6a is set to make optical coupling to the optical output port OFF.

Figure 4:
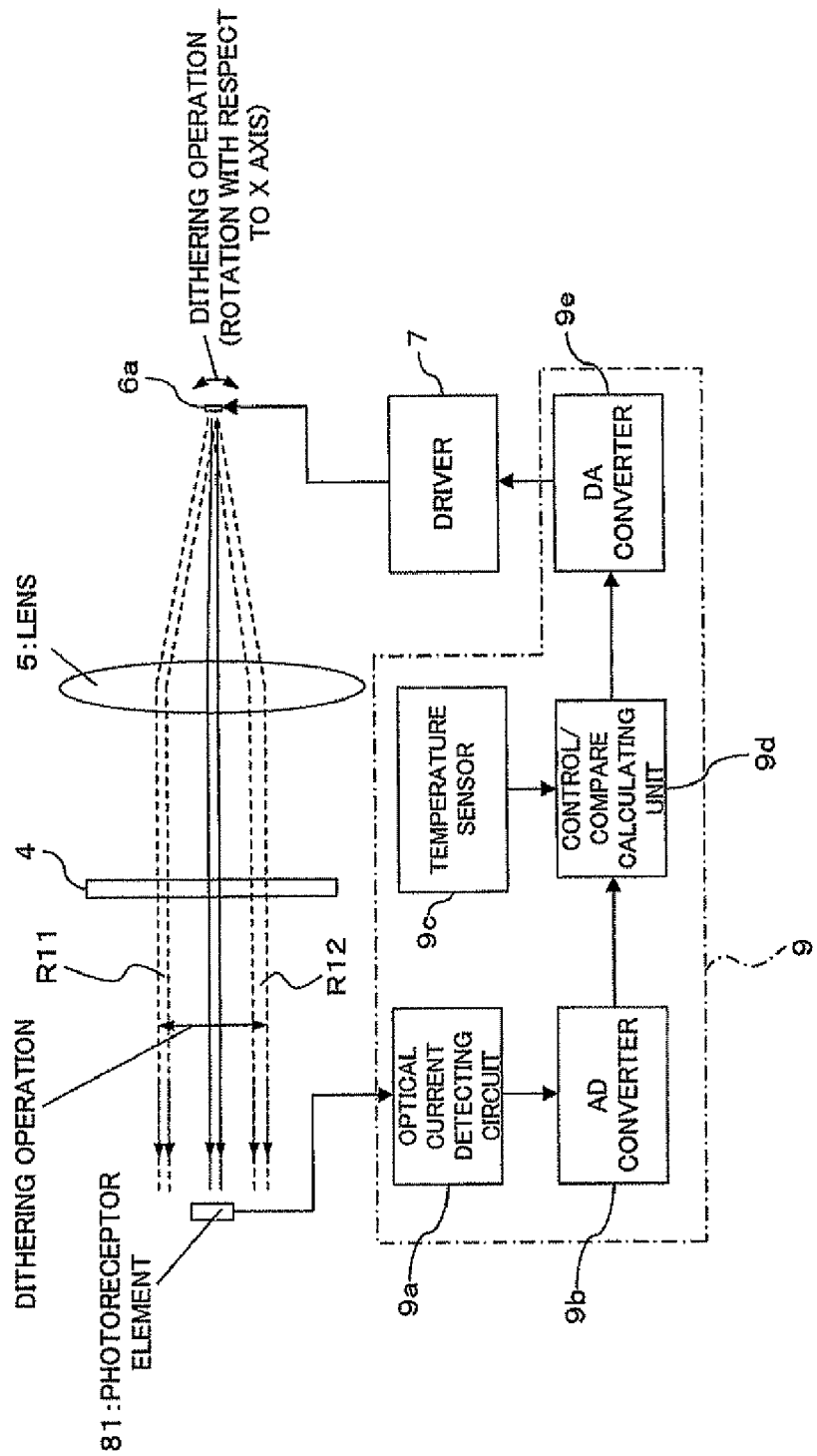

For this purpose, the controlling unit 9, as shown in FIG. 4, has an optical current detection circuit 9a, an AD converter 9b, a temperature sensor 9c, a control/compare calculating unit 9d, and a DA converter 9e. The optical current detection circuit 9a detects an electric signal corresponding to the light amount received by the photoreceptor element 81, and for example, it is made of an amplifier, etc. The AD converter 9b converts an electric current signal value (analogue signal) detected by the optical current detection circuit 9a into a digital signal.

Further, the control/compare calculating unit 9d controls setting of the above-described tilt angle of each of the mirror 6a with respect to the X axis, thereby regulating connection of the optical input/output port of the in-service wavelength channels. In addition, the control/compare calculating unit 9d performs controls the tilt angle with respect to the Y axis for each mirror 6a, thereby radiating light of the in-service wavelength channels to the coupling region of the collimator 2 which passes to the optical output port. On the other hand, light of out-of-service wavelengths is radiated to the shutter movement region St.

At that time, in the control/compare calculating unit 9d, the mirror 6a, which reflects standby channel light which is radiated to the shutter movement region St, is controlled so as to make a dithering operation in which the mirror 6a rotate alternatively in two opposite directions or cyclically with respect to the X axis as shown in FIG. 4 byway of setting control of the tilt angles. That is, the light axis of light on the return path which reflects to the mirror 6a which has made a dithering movement under control of the control/compare calculating unit 9d cyclically varies between the optical axes R11 and R12 shown in FIG. 4.

Figure 5:
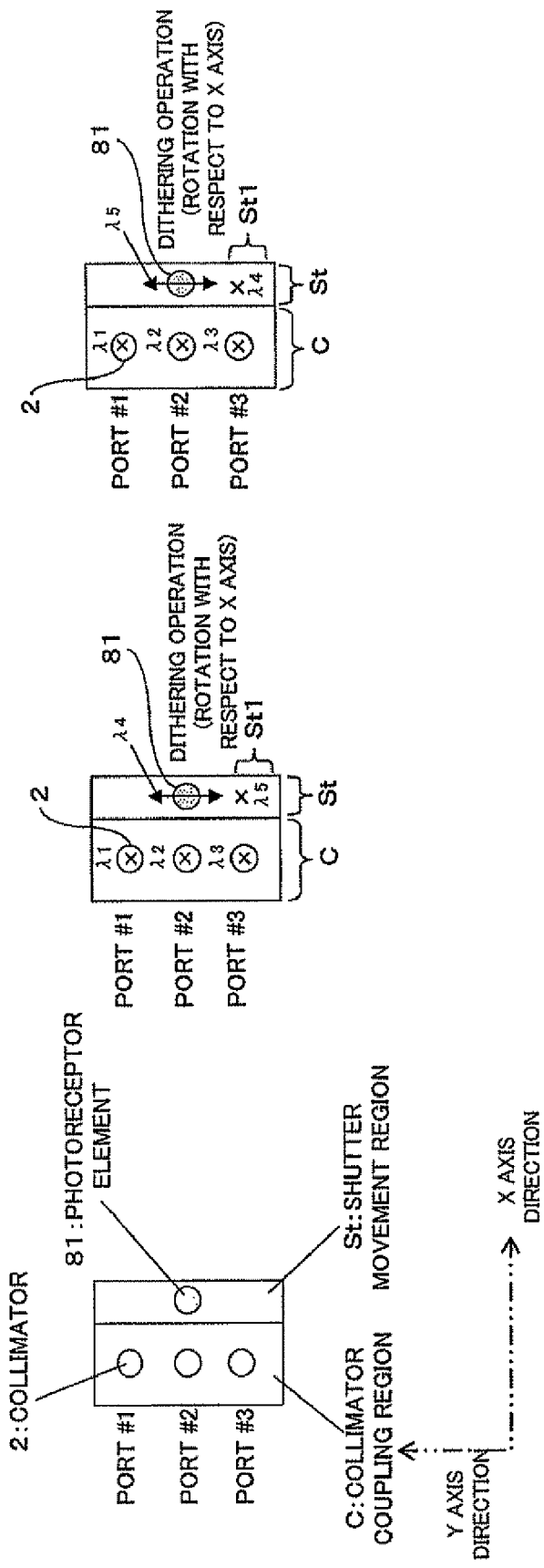

FIG. 5(a) through FIG. 5(c) are diameters for describing relative variation of the light amount received by the photoreceptor element 81 by means of cyclic variation of the optical axis together with the arrangement relationship between the collimator 2 and the photoreceptor element 81. In FIG. 5(a) through FIG. 5(c), as an example, three collimators 2 are arranged in the collimator coupling region C as collimator 2, and three collimators 2 are arranged in the collimator coupling region C. A photoreceptor element 81 is installed in the collimator coupling region C as the collimators 2 to be coupled to the optical input/output port. Here, FIG. 5(a) through FIG. 5(c) never indicate that the present invention is limited in the number of wavelength channels.

Here, as shown in FIG. 5(b) and FIG. 5(c), wavelength channels λ1 through λ3 in-service are coupled to the collimators 2 which serve as port #1 through #3. Standby wavelength channels λ4 and λ5 are input to the shutter movement region St.

The light on the return path is shut out from the collimator coupling region C by means of rotation of the reflection surface with respect to the Y axis of the mirror 6a. Thus, as shown in FIG. 5(a) through FIG. 5(c), the shutter movement region St is arranged at a position deviated from the collimator coupling region C with respect to the X axis. As a result, as shown in FIG. 5(b), the standby wavelength channel λ4 is subjected to dithering operation with respect to the X axis, so that the position of light input to the shutter movement region St can be made up and down along the Y axis with the photoreception position as reference position. In addition, if a dithering operation is made along the Y axis, the light position to which light is input to the shutter movement region St can be moved from side to side along with the X axis with the photoreception position of the photoreceptor element 81 as a reference.

As described below, it is possible to monitor an operation state of the mirror 6a which reflects wavelength λ4 by means of monitoring up and down movement of light of wavelength λ4 which is input to the shutter operation region St. In this instance, if multiple wavelength channels are present, as shown in FIG. 5(b) and FIG. 5(c), for example, in a case where two multiple wave channels λ4 and λ5 are in standby, optical variation is monitored by sequentially dithering for each wavelength.

In this case, as shown in FIG. 5(b), light of the wavelength channel λ4 is firstly subjected to dithering, thereby making the light of λ4 to be an object of supervising. During that, light of another wavelength of channel λ5 is input to a retraction area St1 which is deviated from the reception light position pf the photoreceptor element 81 of the shutter operation region St. Next, as shown in FIG. 5(c), the light of wavelength channel λ5 is subjected to dithering to switch light of λ5 to the monitoring object. On the other hand, light of the wavelength channel λ4 is input to the retraction area St1. In this manner, in all the standby wavelength channels, wavelength channels to be supervised are changed at a predetermined cyclic duration. As a result, it becomes possible to supervise deterioration of transient response of the mirror 6a in particular.

Figure 6:
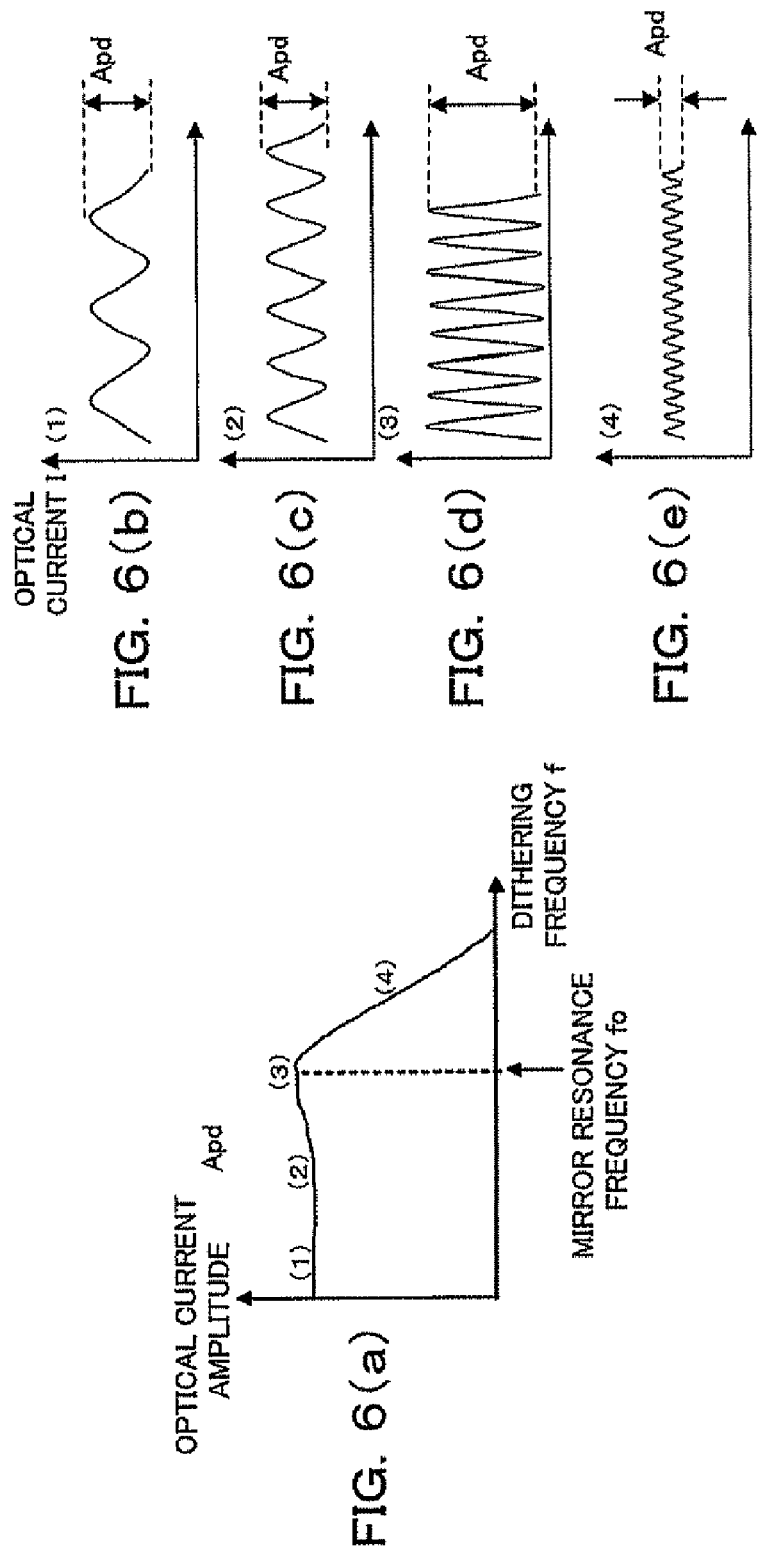

FIG. 6(a) through FIG. 6(e) are diagrams describing that the possibility of supervising deterioration of transient response of the wavelength channel, by dithering the mirror 6a to be monitored. Through control by the control/compare calculating unit 9d, if the frequency of the dithering operation is given as "f", the optical current amplitude by the photoreceptor element 81 is changed, as shown in FIG. 6(a) according to the dithering frequency.

Since in frequency region of (1) and (2) in FIG. 6(a), as shown in FIG. 6(b) and FIG. 6(c), a light input position varies in correspondence with the mirror amplitude width due to dithering of the mirror 6a, which indicates stable optical amplitude Apd is obtained. In other words, since having the mirror amplitude corresponding to the driver signal (modulated amplitude) from the driver 7, an stable value with respect to the optical current amplitude Apd in the photoreceptor element 81 is realized.

On the other hand, when the dithering frequency becomes f0 [see (3) of FIG. 6(a)], the mirror 6a makes resonant movement. Thus, the angle of fluctuation is considered to become the maximum. That is, as shown in FIG. 6(d), the optical current amplitude Apd of the photoreceptor element 81 takes the maximum value. Accordingly, f0 at this moment can be resonance frequency with respect to the X axis of mirror 6(a). Then, when the dithering frequency becomes larger than the dithering frequency f0 [see (4) of FIG. 6(a)], the mirror 6a cannot support the frequency (modulated frequency) of an activating signal. Thus, the deviate angle of the mirror 6a becomes also small, and as shown in FIG. 6(e), optical current amplitude Apd in the photoreceptor element 81 becomes smaller than the above-described cases FIG. 6(b) through FIG. 6(d).

Accordingly, when the mirror 6a normally works, the control/compare calculating unit 9d holds the optical current amplitude value at the photoreceptor element 81 corresponding to the modulation frequency at the time of manufacturing of the movable mirror array 6, for example. By means of comparing the correspondence between the modulated frequency and the optical electric current amplitude Apd, it becomes possible to monitor deterioration of the transient response characteristics of the mirror 6a.

More specifically, it can be assumed that at the time at which optical current amplitude value becomes the maximum at the mirror 6a to be monitored, resonance occurs. When this amplitude value is within the predetermined region to the amplitude value measured at manufactured time held as described above, it is decided that it is not deteriorated. On the other hand, when the amplitude value is out of the region, it is decided to be deteriorated, and an alarm is output.

In this manner, the control/compare calculating unit 9d, the DA converter 9e, and the driver 7 composing the controlling unit 9 construct a mobile movement giving unit which varies the angle of the mirror 6a with respect to the X axis and the Y axis in the mirror 6a so that the orbit of a light beam, whose optical coupling to the optical output port is OFF, is cyclically moved to the optical output port becomes OFF.

In addition, the optical current detection circuit 9a, the AD converter 9b, and the control/compare calculating unit 9d, which make the controlling unit 9, construct a monitoring unit which monitors the movement state of the mirror to which a light beam of the out-of-service light wavelength is reflected based on the monitoring result obtained at the monitoring unit 8. Further, this control/compare calculating unit 9d, as a monitoring unit, is capable of monitoring the operation state of the mirror 6a which reflect light beams of out-of-service signal light wavelengths on the basis of the amplitude of light amount changes which are monitored by the photoreceptor element 81 based on the movement operation given by the movement operation giving unit.

In this instance, in the first embodiment, the control/compare calculating unit 9d decides a resonance point based on the optical current amplitude value input through the optical current detection circuit 9a and the AD converter 9b. However, if a photoreceptor element 81 whose response speed is sufficiently higher than the optical current amplitude value input through the driver 7, the control/compare calculating unit 9d is capable of taking into the frequency of the direct reception signal to monitor the operation state of the mirror 6a.

In this instance, the control/compare calculating unit 9d, in consideration of the fact that the response characteristic of the mirror 6a depends on the ambient temperature, is capable of controlling the driver 7 in order to give the driving signal corresponding to the ambient temperature of the mirror 6a detected by the temperature sensor 9c.

Figure 7:
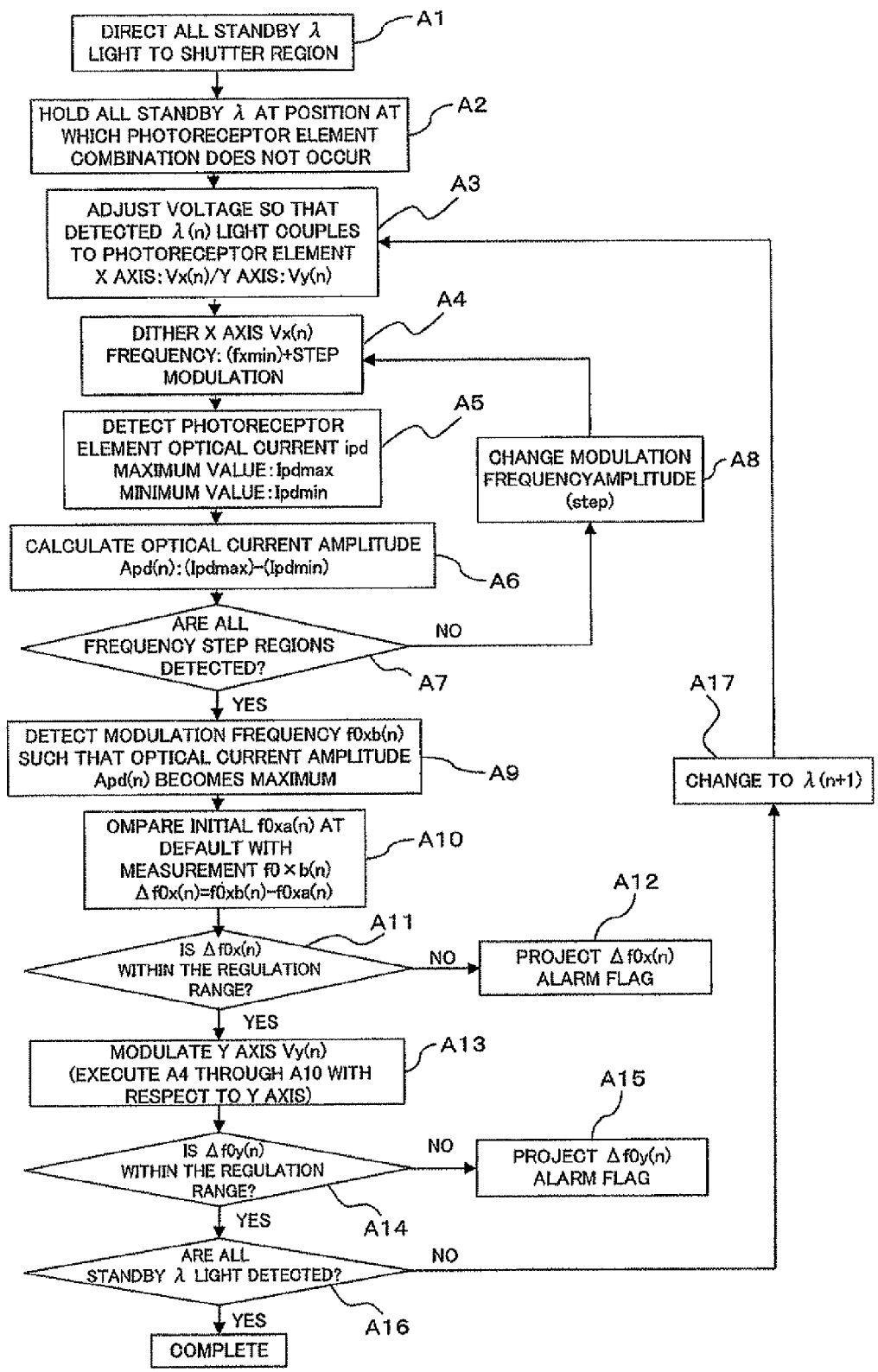
FIG. 7 is a flowchart for describing an operation of the optical switch according to the first embodiment.

As to the monitoring operation with respect to the standby wavelength channel of the optical switch 1 according to the first embodiment, a description will be made below using the flowchart of FIG. 7.

First of all, standby channels not in service direct all to the shutter movement region [see St of FIG. 3, FIG. 5(a) through FIG. 5(c)] to prevent unnecessary optical coupling to an channel (step A1), and this mirror movement region holds standby channels (step A2).

Then, the monitoring object is determined as the mirror 6a which reflects an optical beam of wavelength λn. After that, to optimize coupling the light reflected by the mirror 6a to the photoreceptor element 81, an X axis activating voltage Vx(n) for X axis rotation and a Y-axis activating voltage Vy(n) for Y axis rotation, as activating signals, are adjusted (step A3). At that time, in a case where there are multiple standby channels, they are sequentially treated as a supervising object one by one. In this instance, Vx(n) and Vy(n) can be adjusted at the time they are manufactured beforehand to make coupling to the photoreceptor element optimal and can be stored in a memory or the like.

Next, through activation of mirror 6a by control of the controlling unit 9 to the driver 7 and activation of activation of mirror 6a by the driver 7, the movable mirror 6a which area to be monitored make a dithering operation to detect the resonance frequency f0 of the mirror 6a. At that time, the frequency in which a dithering operation is made, is an appropriate range which is across f0, from a frequency lower than a considerable resonance frequency f0 to a frequency higher than f0, and it is varied by an appropriated step value. In addition, modulation amplitude is set as an appropriate range such that an AD converter 9b (see FIG. 2), which performs AD conversion of the photoreceptor element 81 and optical current, is not saturated and effects of noise level do not exist.

Here, in the control/compare calculating unit 9d of the controlling unit 9 (see FIG. 2), to perform dithering reflection surface angle with respect to the X axis, while controlling the driver 7 so that starting from a frequency component value which is given to Vx(n) that is sufficiently (fxmin) smaller than an assumed frequency component, and so that increase by a step value (step A4). At every time, the maximum value Ipdmax and the minimum value Ipdmin of the optical electric current Ipd detected by the photoreceptor element 81 are extracted (step A5), and the optical current amplitude Apd(n) =Ipdmax−Ipdmin is calculated (step A6).

Such calculation of optical current amplitude is sequentially continued by adding a step value step until fxmax, which is a sufficiently high frequency across f0, is obtained (NO route from step A7 to step A8, from step A8 through step A4 through step A6).

Then, as a result of dithering within a range of fxmin through fxmax across f0, the dithering frequency (modulation frequency) f0xb(n) at the time the optical current amplitude Apd(n) becomes the maximum is detected (from YES route of step A7 through step A9). As described above, as a result of dithering the mirror 6a, the dithering frequency f0xb(n) given to the mirror 6a at the time the optical current amplitude detected by the photoreceptor element 81 becomes the maximum is a substantial resonance frequency of the movable mirror 6a.

The measured resonance frequency f0xb(n) detected by the above described operation is compared with the initial resonance frequency f0xa(n), which is tested at the time of shipping and stored in the memory f0xa(n), to compare to know whether to be the same as the variation threshold value fc, which has been determined beforehand. More specifically, a difference Δf0xb(n) between the detected resonance frequency f0xb(n) and the resonance frequency f0xa(n) of the mirror 6a at the time of shipping of the optical switch 1 is calculated (step A10). Depending on whether this difference Δf0x(n) is smaller or not than a regulation upper limit value fxc, it is evaluated whether or not Δf0x(n) is within a regulation region (step A11).

At that time, if Δf0x(n) is larger than fxc, which means the difference Δf0x(n) is beyond the regulation region, so that it is decided that the mechanical strength of the mirror 6a, which is the object of monitoring, is lowered, and then, the control/compare calculating unit 9d outputs an alarm flag meaning that any disorder or deterioration has occurred in an upper system not illustrated (from NO route of step A11 to step A12).

Further, if f0x(n) is within the reguration region (YES rout of step A11), as a result of dithering with respect to the X axis, it is possible to supervise by dithering with respect to the above-mentioned Y axis. More specifically, similar to dithering of the reflect surface angle with respect to the X axis, the driving voltage Vy(n) is subjected to dithering as to reflection surface angle with respect to the Y axis. As a result, the resonance frequency f0yb(n) is obtained (step A13), and it is evaluated whether the obtained frequency f0yb(n) is within the regulation (see from step A14, steps A10 and A11 in a case of X-axis dithering).

In this case, also, if Δf0yb(n) is larger than the regulation upper limit fyc, which means Δf0yb(n) exceeds the regulation range having been decided forehand, it is decided that the mechanical strength of the mirror 6a which is the object of monitoring is lowered, and the control/compare calculating unit 8d outputs an alarm flag meaning that disorder or deterioration occurs in an upper system not illustrated. (from NO route of step A14 to NO route of step A15).

In this manner, supervising of the mirror 6a which reflects a light beam of wavelength λn is completed (YES rout of step A14). In a case where wavelengths of other standby channels exist, the similar supervising to the above described supervising is performed individually for a wavelength with respect to the mirror 6a reflecting wavelengths of all the standby channels (from NO route of step A16 to step A3 by way of step A17), and supervising of the mirror 6a reflecting wavelengths of all the standby channels (YES route of step A16) is performed.

As described above, according to the optical switch 1 of the first embodiment of the present invention, the monitoring unit 8 and the controlling unit 9 supervise the performance of standby optical switches to detect mechanical or electric deterioration of standby channels which are not in service, without effecting in-service channels. Thus, it is possible to improve reliability of the optical switch 1 in service.

[B] Second Embodiment

Figure 8:
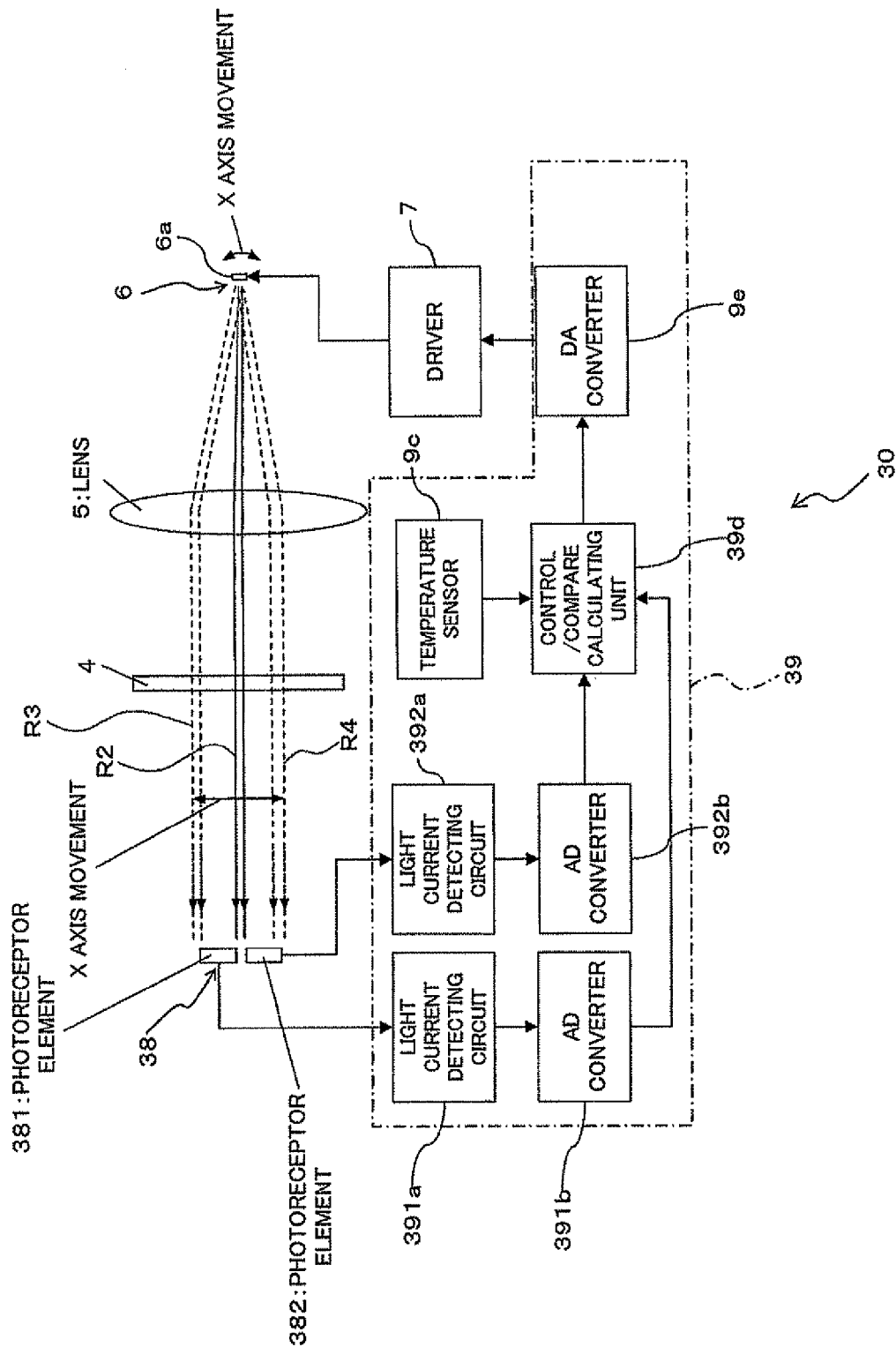
FIG. 8 is an diagram showing an optical switch according to a second embodiment of the present invention.

FIG. 8 is a diagram showing the construction of an important part of an optical switch 30 according to a second embodiment of the invention, and corresponds to a diagram of a view direction shown in FIG. 4 of the optical switch 1 according to the first embodiment. An optical switch 30 shown in FIG. 8, as in the case of the optical switch 1 according to the first embodiment, functions as a wavelength-selective optical switch.

Here, although the optical switch 30 according to the second embodiment, as in the case of the optical switch 1, basically has collimators which are not illustrated and similar to those of the optical switch 1, an expander, a photoreceptor element 4, a lens 5, a movable mirror array 6, and a driver 7, it is different from the optical switch 1 in that it has a monitor unit 38 and a controlling unit 39 having a different construction of those of the optical switch 1. In this instance, items indicated by the same reference characters are approximately similar to those of FIG. 4.

The optical switch 30 according to the second embodiment, different from the above-described first embodiment, has collimators 2 arranges in parallel, and has a photoreceptor element pair 38 including two photoreceptor elements 381 and 382 along the Y axis arranged in parallel with the collimators 2. These two photoreceptor elements 381 and 382 arranged so that photoreceptive sensitivities overlap along the movement direction of a light beam orbit given by the controlling unit 39 (described later) and the driver 7.

Thus, the controlling unit 39 have two optical electric current detection circuits 391a and 392s fro detecting received optical current from the above photoreceptor elements 381 and 382, and each also have AD converters 391b and 392b which perform A/D (analogue/digital) conversion of signals from the electric current detection circuits 391a and 392a.

Further, the control/compare calculating unit 39d, together with the above DA converter 9e and the driver 7, performs setting controls of the reflection surface angle of the mirror 6a of the movable mirror array 6, and function as a mirror angle control unit. It also functions as a movement operation giving unit which moves the reflection face angle of the mirror 6a with respect to the X axis and the Y axis.

In addition, the control/compare calculating unit 39d constructs a monitoring unit, together with the above described optical current detecting circuits 391a and 392a. That is, the above-described optical current detecting circuits 391a and 392a, the AD converters 391b and 392b, and the control/compare calculating unit 39d cooperate to detect the control amount for obtaining the angle of the mirror 6a at the time the photoreception sensitivities overlap resulting from the movement operation given by the driver 7 on the basis of a signal corresponding to the light amount received by the photoreceptor element pair 38, and monitors rotation mirrors condition which reflect light beams of wavelengths whose optical coupling to the optical output port is made to be OFF.

FIG. 9(a) through FIG. 9(c) each are diagrams for describing an arrangement relationship of the collimators 2 and photoreceptor element pair 38, and also movement of light input to the shutter movement region St. As shown in FIG. 9(a) through FIG. 9(c), to monitor deterioration of static characteristics of the mirror 6a of the movable mirror array 6, two photoreceptor elements 381 and 382 are provided. In this instance, in FIG. 9(a) through FIG. 9(c), the number of ports is three, but the number of ports should by no means be limited.

The collimators 2 are arranged at positions at which each collimator 2 is coupled to each optical input output port within the collimator coupling region C. The two photoreceptor elements 381 and 382 arranged in parallel with the collimators 2 within the shutter movement region St in which coupling to the collimators 2 is made to be OFF.

Here, in the examples of FIG. 9(b) and FIG. 9(c), wavelengths channels λ1 through λ3 in service are coupled to the collimators 2 as ports #1 through #3, respectively. The standby wavelengths channels λ4 and λ5 are input to the shutter movement region St.

Then, for example, in a case where the wavelength channel λ4 is to be supervised, the mirror 6a corresponding to λ4 is rotated in the direction of the X axis, as shown in FIG. 8 and FIG. 9(b), so that the incident position of the return light of the wavelength λ4 input to the shutter movement region St is across the photoreceptor elements 381 and 382 in the illustrated arrow direction AR. At that time, the wavelength channel λ5 is input to the save region St1 which saves input to the photoreceptor elements 381 and 382.

That is, the control/compare calculating unit 39d activates the driver 7 through the DA converter 9e, thereby rotating the mirror 6a for the standby channel λ4 with respect to the X axis. As a result, return light R2 shown by the solid line in FIG. 8 moves up and down like return light R3 and R4 which are indicated by the broken lines in FIG. 8.

At that time, since the photoreceptor elements 381 and 382 have an appropriate photoreception diameter corresponding to the diameter of the incident light beam, and are arranged at appropriate intervals, the control/compare calculating unit 39d can deviate an activating light value which is that when the mirror 6a is at a reference angle.

That is, optical currents from the photoreceptor elements 381 and 382 detected by the optical current detecting circuits 391a and 392a have relationships shown in FIG. 10(a) and FIG. 10(b), respectively. At that time, since the install interval of the photoreceptor elements 381 and 382 is adjusted, as shown in FIG. 10(C), at a certain driving voltage (reference driving voltage V), the detection values of optical currents from the photoreceptor elements 381 and 382 overlap. In other words, at an absolute angle position, in the mirror 6a, the optical current detection values from the photoreceptor elements 381 and 382 overlap.

The control/compare calculating unit 39d takes in the detection electric current value from the AD converters 391b and 392b, and deviates a reference driving voltage V0 with respect to the mirror 6a when the difference between detection electric current values takes zero. On the other hand, driving current values from the photoreceptor elements 381 and 382 of when the optical current detection values overlap (for obtaining the rotation angle of the mirror 6a), as mentioned above, are measured at the time of shipping, and stored in a memory or the like provided inside the control/compare calculating unit 39d.

Then, the control/compare calculating unit 39d measures the above-mentioned reference driving voltage V0 by means of activating the monitoring operation at appropriate cycles, and compares it with data in the memory of the time of a test. At that time, when the comparison result exceeds a predetermined threshold value, the control/compare calculating unit 39d is capable of outputting an alarm to the upper system as disorder.

In this instance, when multiple standby channels exist, as shown in FIG. 9(c), λ5, which was in standby, and λ4 are exchanged, and deterioration detection of λ5 is performed. The above-described operation is performed in all the standby channels at an appropriate cycle, thereby making it possible to supervise static deterioration of the standby channels.

Further, when a standby channel switch instruction comes from the upper system during a sequential deterioration detection operation, control can be performed in such a manner that the deterioration detect ion operation is immediately halted, and a target connection is performed or a control is performed so that such a deterioration detection operation is performed only when an instruction is given from the upper system.

Figure 11:
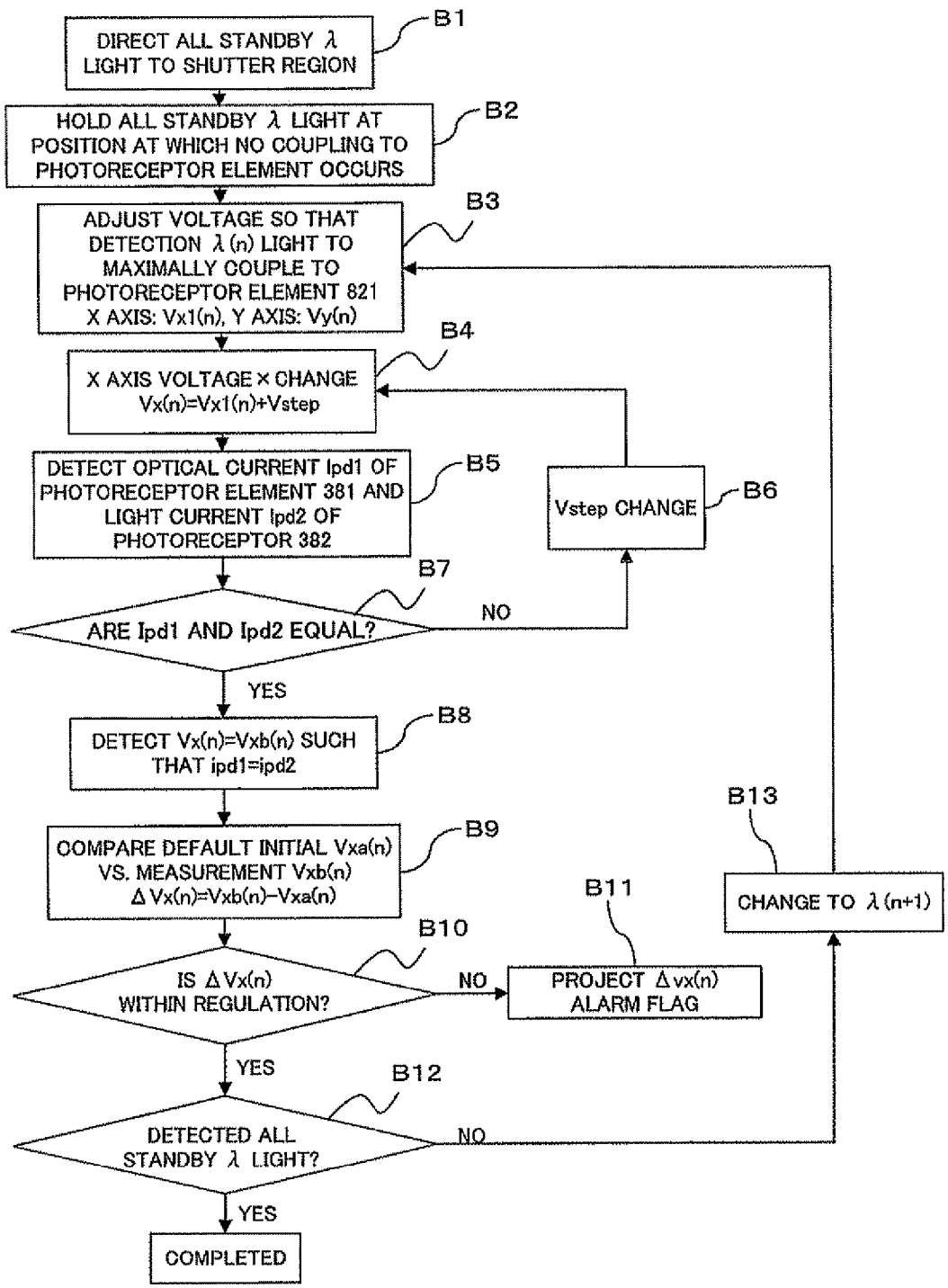
FIG. 11 is a flowchart for describing an operation of an optical switch according to the second embodiment.

As to a supervising operation of a standby wave channel of the optical switch 30 having the above-described construction, a description will be made hereinbelow using the flowchart of FIG. 11.

First of all, as in the case of the above-described first embodiment, all the standby channels not in service are directed to the shutter movement region [see St of FIG. 10(a) through FIG. 10(c)] (step B1), and standby channels are held in this shutter movement region (step B2). Then, provided that the monitoring object is a mirror 6a reflecting an optical beam of wavelength λn, the voltage Vx1(n) for the X axis rotation and the voltage Vy(n) for the Y axis rotation, as driving signals, are adjusted so that coupling to one photoreceptor element 381 reflected from the mirror 6a becomes optimal (step B3).

Next, the control/compare calculating unit 39d activates the driver 7 through the DA converter 9e, thereby increasing an activating voltage Vx(n) output from the driver 7 for rotation of the mirror 6a with respect to the X axis by increasing from the above-mentioned Vx1(n) by an increment voltage value Vstep. As a result, the mirror 6a is rotated to move the incident position of light of λ4 which is input to the shutter movement region St to the direction for optical coupling to the photoreceptor element 382 (step B4).

At that time, every when the activating voltage is increased, the control/compare calculating unit 39d evaluates whether or not optical current detection values Ipd1 and Ipd2 from the photoreceptor elements 381 and 382 (step B5), from which it is evaluated whether or not the detection values of optical current from the photoreceptor elements 381 and 382 (step B7) overlap. That is, the control/compare calculating unit 39d takes in the detection current values from the AD converters 391b and 392b, and until the above-mentioned optical current detection value difference becomes zero, the above-described voltage Vstep is increased by a predetermined increment width λStep (Vstep=Vstep+ΔStep) to increase an driving voltage Vx(n) (step B4 through from NO route of step B7 through step B6).

As a result, it is possible to detect a driving voltage Vxb(n) at the time the detection electric current from the above described AD converters 391b and 392b are equal (from YES route of step B7 through step B8). On the other hand, the driving current value Vxa(n) at the time the light current detection values from the photoreceptor elements 381 and 382 overlap, which has been measured at the time of shipping is taken out from the memory or the like provided for inside the control/compare calculating unit 39d, and compared with Vxb(n) detected as described above. More precisely, a difference ΔVx(n) between these Vxb(n) and Vxa(n) is obtained (step B9), and evaluates whether or not the ΔVx(n) becomes not greater than the regulation Vc, thereby evaluating whether or not ΔVx(n) is within the regulation range (step B10).

At that time, while ΔVx(n) is not greater than Vc (YES route of step B10 and step B12), it is decided no abnormality occurs. On the other hand, when ΔVx(n) is greater than Vc, ΔVx(n) exceeds the regulation range. Thus, it is decided that the mechanical strength of the supervised mirror 6a is lowered, and the control/compare calculating unit 39d outputs an alarm meaning that any disorder or deterioration has been occurred to the not illustrated upper system (from NO route of step B10 through step B11).

In this manner, supervising of the mirror 6a which reflects a light beam of wavelength the monitored mirror 6a decides λn is completed. If wavelengths of other standby channels exist, the same supervising as the above is performed to all wavelengths one by one, with respect to all the mirror 6a which reflect all the standby channels (from NO route of step B12 to step B3 through step B13), and supervising is performed to all the mirror 6a reflecting wavelengths of all the standby channels (YES route of step B12).

That is, in a case where multiple wavelengths exist whose optical coupling to the optical output port is made to be OFF, the control/compare calculating unit 39d supervises the angle of the mirror 6a of one wavelength, which is a supervising object out of the multiple wavelengths, and also switches rotatable mirrors of wavelengths which are object of supervising.

In this manner, according to the optical switch 30 of the second embodiment of the present invention, also, the monitoring unit 38 and the controlling unit 39 monitor the performance of optical switching in the standby channel, and thereby, it is possible to detect the characteristic changes such as the mechanical and electrical deterioration of the standby channels not in service without influencing channels in service, so that the reliability of the optical switch 1 in service is improved.

Further, different from the first embodiment, as to the mirror 6a to be monitored, movement of an incident position to the shutter movement region St does not need to and fro movement, so that it is possible to simplify the control of a mirror 6a, thereby reducing load to the mirror 6a for supervising. As a result, it can be expected that disorder detection processing is sped up.

In this instance, the photoreceptor element pair 38 according to the above-described second embodiment has two photoreceptor elements along the direction of the arrangement direction of the collimator 2 (Y axis direction). However, according to the present invention, two photoreceptor elements can be arranged along the X axis, and with respect to the mirror 6a to be supervised, the movement of an incident position to the shutter movement region St can be performed along the X axis direction. As a result, it becomes possible to supervise the movement state in the rotation direction with respect to I axis of the mirror 6a.

Figure 12A:
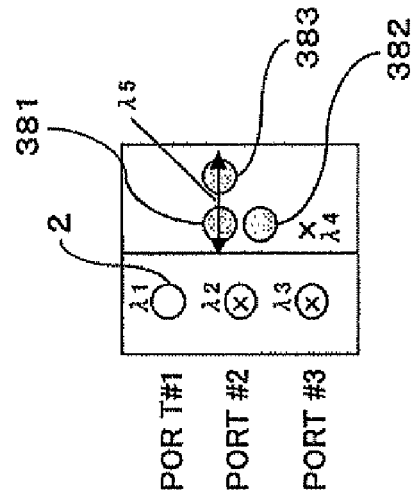
FIG. 12(a) and FIG. 12(b) both are a modified examples of an optical switch according to the second embodiment.
Figure 12B:
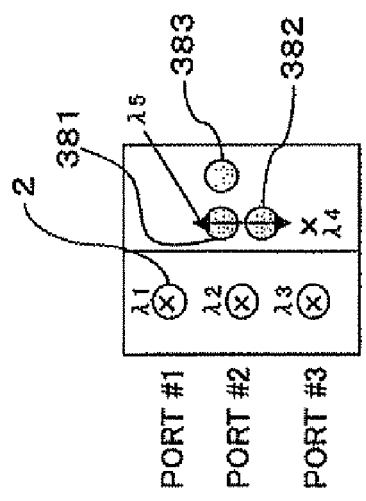

Further, as shown in FIG. 12(a) and FIG. 12(b), in addition to two photoreceptor elements 381 and 382 arranged in the arrangement direction (Y axis direction) of the collimator 2 together with a photoreceptor elements 381 and 382, a photoreceptor element 383 arranged in the direction along the X axis can be provided. With this construction, together with the movement state in the rotation direction with respect to the X axis of the mirror 6 as shown in FIG. 12(a), the movement state in the rotation direction with respect to the Y axis of the mirror 6a as shown in FIG. 12(b) can be supervised. As a result, it is possible to improve supervising accuracy in comparison with the above-described second embodiment.

[C] Third Embodiment

Figure 14:
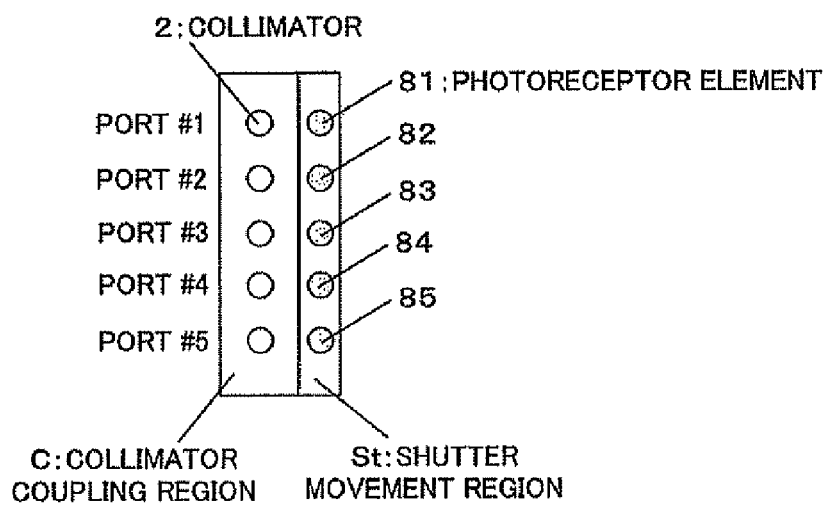
FIG. 14 is a diagram showing the third embodiment of the present invention.

FIG. 14 is a diagram showing a third embodiment of the present invention. In the above described first embodiment, the optical switch 1 has one photoreceptor element 81 in the shutter movement region St. However, as shown in FIG. 14, in association with arrangement of multiple photoreceptor elements, in particular, each output port (or collimator coupling to each input/output port), photoreceptor elements 81 through 8n (in FIG. 14, five photoreceptors 81 through 85) equal in number of the ports can be provided.

Further, in order to detect optical currents corresponding light received by the photoreceptor elements 81 through 85, multiple optical current detecting circuits and AD converters equal in number of the photoreceptor elements as in the case of the second embodiment can be provided. In this instance, the other constructions can be the same as those in the first embodiment.

In addition, in FIG. 14, collimators 2 corresponding to the optical output ports #1 through #5 are provided for the collimator coupling region C, but this does not mean that the number of optical input/output ports is limited.

Figure 13:
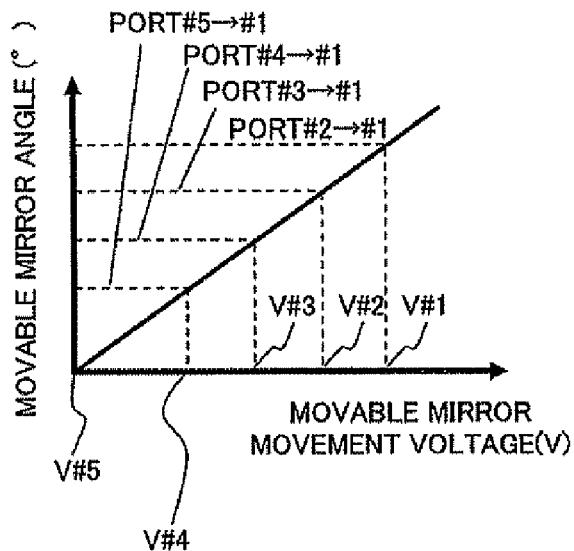
FIG. 13 is a diagram for describing a third embodiment of the present invention.

Here, the tilt angles of the mirror 6a (see FIG. 1) composing the movable mirror array 6 are changed in accordance with an activating voltage, as shown in FIG. 13. For example, return light to be reflected by a certain mirror 6a is coupled to the collimator 2 of the port #5, the mirror angle to be tilted is the minimum in comparison with the other ports #1 through #4, and an activating voltage signal necessary for the mirror 6a becomes the minimum voltage V #5.

On the other hand, as the collimator 2 coupled to the return light reflected by the mirror 6a is made correspond to the port #4 through the port #1 at the positions apart from the port 5#, the tilt angle necessary for the mirror 6a becomes larger, and the corresponding driving voltage signals also become larger (V #4 through V #1).

In this manner, when the positions of the ports #1 through #5 to which return light is to be optically coupled differ, the tilt angles of the X axes of the corresponding mirror 6a are different. Thus, the tilt angle with respect to the X axis at the time being coupled to each port is imitated, thereby making it possible to supervise each operation condition. As a result, it becomes possible to perform more accurate supervising in comparison with the above-described first embodiment.

That is, as in the case of the first embodiment, by means of monitoring the mirror 6a due to the monitor of an optical current amplitude through deviating the number of resonance frequencies by each photoreceptor elements 81 trough 8n, it becomes possible to detect disorder under all the mirror tilt state coupling to the optical output ports. More precisely, wavelengths coupled to the photoreceptor elements 81 through 85 provided corresponding to the ports #1 through #5 are allocated by standby channel wavelengths, thereby monitoring the operation state of the corresponding mirror 6a.

As an example case, when the wavelength λ1 is in standby, first of all, for example, from the state where coupling is performed to the photoreceptor element 81, the similar dithering as in the case of the first embodiment is performed. This makes it possible to supervise the mirror 6a which reflects wavelength λ1 in a condition where coupling is performed to the port #1. From then on, by means of performing dithering in a condition where coupling is performed to the photoreceptor elements 82 through 85, it is possible to supervise the operation state in a condition where coupling is performed to the ports #2 through #5.

Further, if there are multiple standby channels, wavelengths to be coupled to the photoreceptor elements 81 through 85 are allocated one by one and performs supervising. On the other hand, wavelength allocation to be coupled to the photoreceptor elements 81 through 85 at a fixed cycle, is sequentially changed. As a result, it becomes possible to perform supervising of multiple standby channels to the corresponding ports #1 through #5 efficiently and accurately.

That is, by means of controlling the driver 7 in order to supply an activating voltage which is memorized beforehand corresponding to the association of port switching for each wavelength, the tilt angles of the mirror 6a are appropriately set to attempt to obtain a target optical coupling. However, disorder in which the angle does not reach the target angle occurs is probable. At that time, like the third embodiment of the present invention, a construction for detecting disorder corresponding to each port makes it possible to detect disorder at angles coupling to all the optical ports for each mirror 6a reflecting a wavelength channel.

As described above, according to the third embodiment of the present invention, in addition to the similar advantages of the first embodiment, photoreceptor elements of the number corresponding to the number of the optical output port are arranged in parallel with the optical output ports. As a result, it is possible to improve the accuracy of monitoring.

[D] Fourth Embodiment

Figure 15:
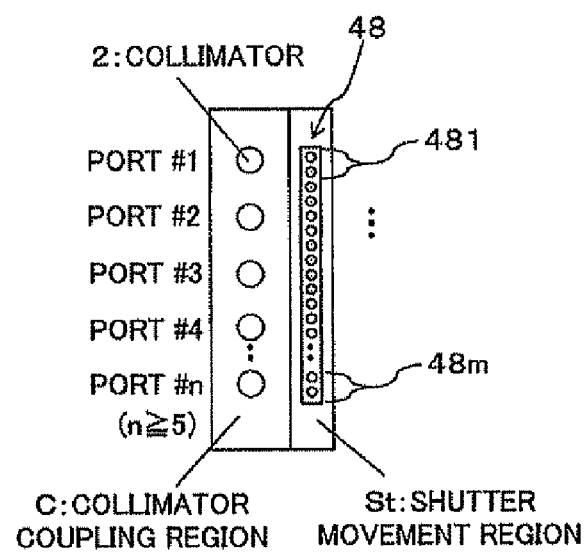
FIG. 15 is a diagram for describing a fourth embodiment of the present invention.

FIG. 15 is a diagram showing a fourth embodiment of the present invention. In the above-described second embodiment, the optical switch 30 has one photoreceptor element pair 38 (two photoreceptor elements 381 and 382) in the shutter movement region St. However, according to the present invention, multiple photoreceptor element pairs can be provided in parallel with the strain of the collimators 2. For example, as shown in the monitor unit 48 in FIG. 15, switchable (accommodated in the optical switch) photoreceptor element pairs 481 through 48$m$ of the number of wavelength channels (m wavelengths) can be provided, or as an modified example, those of the number of optical output ports can also be provided.

Further, to detect optical currents corresponding to light received by the photoreceptor element pairs 481 through 48$n$, optical current detecting circuits and AD converters equal in number of photoreceptor elements can be provided, as in the case of the second embodiment. In this instance, the other constructions are similar to those of the second embodiment.

Figure 16:
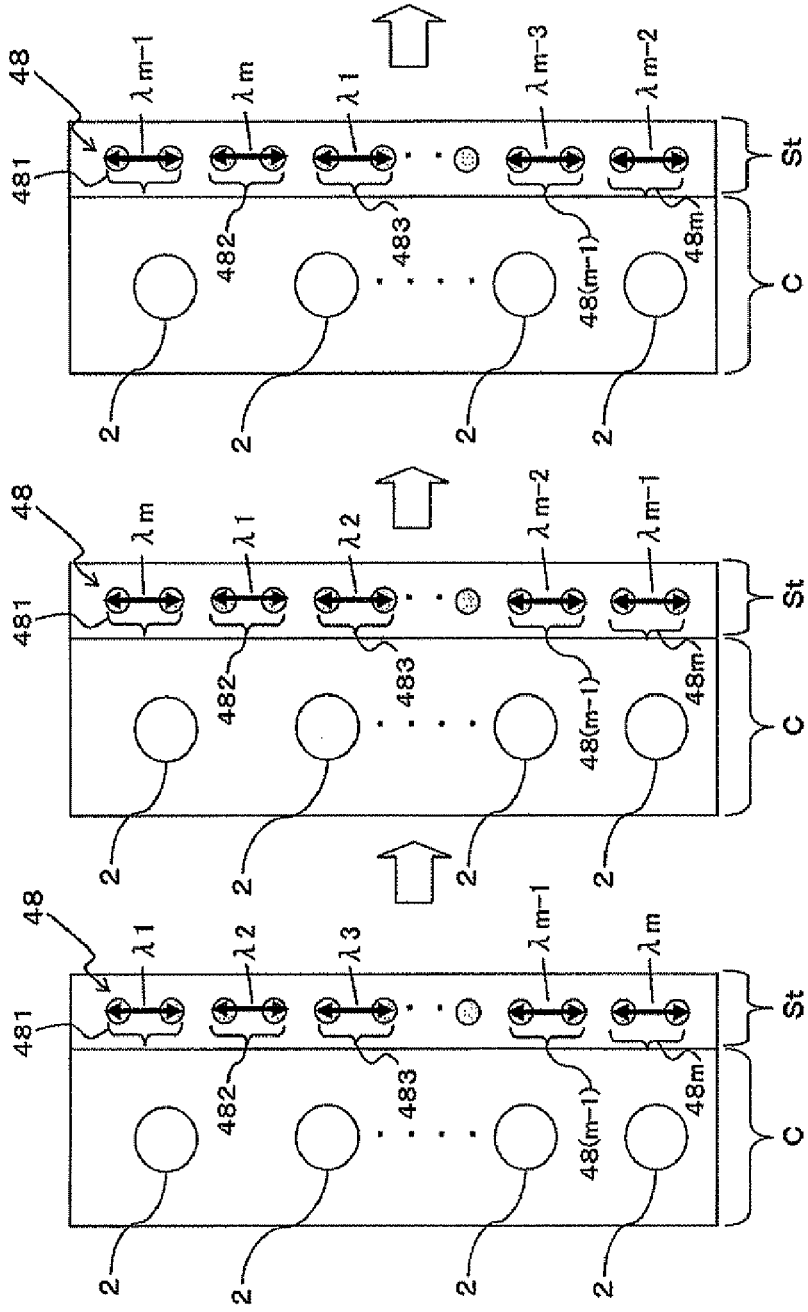
FIG. 16(a) through FIG. 16(c) each are diagrams for describing an operation of the fourth embodiment of the present invention.

As a result, as shown in FIG. 16($a$), for example, the reflection surface angles of the mirror 6a can be set to receive light of wavelengths $\lambda 1$ through $\lambda m$. On the other hand, as in the case of the second embodiment, the operation state of mirror 6a is supervised by means of obtaining reference activating voltages Vx(1) through Vx(m) based on optical current detection values from photoreceptor element pairs 481 thorugh 48$m$.

In addition, in particular, if wavelength channels input to the photoreceptor element pairs 481 through 48$m$ are fixed, relatively large load is applied to the mirror 6a of the particular wavelength light, which mirror's rotation angle is made to be necessary to relatively enlarged. Thus, the association between the wavelength channels to be supervised at a predetermined cycle and the photoreceptor element pairs 481 through 48$m$ are subjected to rotation for switching.

More precisely, following the monitoring in FIG. 16($a$), as shown in FIG. 16($b$), the wavelength channels which are objects of monitoring using the photoreceptor element pairs 481 through 48$m$ are given as wavelengths $\lambda m$, $\lambda 1$ through $\lambda m-1$, respectively. Next, as shown in FIG. 16($c$), wavelength channels which are objects of supervising in use of the photoreceptor element pairs 481 through 48$m$ are given as wavelengths $\lambda m$, $\lambda 1$ through $\lambda m-2$, and from then on, frequencies are sequentially shifted one by one.

Hence, according to the fourth embodiment, the similar advantages to those of the second embodiment are realized. In addition, since the photoreceptor element pairs 481 through 48$m$ of the number (m wavelengths) of switchable wavelength channels are provided, it becomes possible to always supervise disorder of all of the standby channels. Thus, disorder detection in real time is realized, and it is possible to improve the reliability of the accuracy of disorder detection.

In this instance, in the above-described fourth embodiment, (the number m of wavelength channels×2)–number of photoreceptor elements are provided. Provided that at least (the number of wavelengths+1)–number of photoreceptor elements are arranged, a construction for supervising each wavelength channel according to the second embodiment can be applied. In this case, supervising of wavelength channels are sequentially performed, and the adjacent wavelength channel light is saved. Then, when rotating making the association between the wavelength channel to be supervised and a photoreceptor element, it is possible to shift allocation as a photoreceptor element by one photoreceptor element.

[E] Fifth Embodiment

Figure 17:
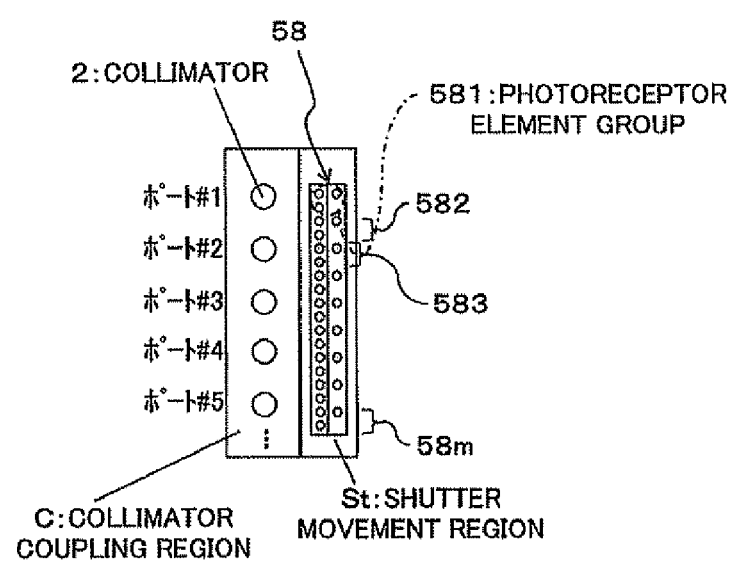
FIG. 17 is a diagram for describing a fifth embodiment of the present invention.

FIG. 17 is a diagram showing a fifth embodiment of the present invention. In the above-described fourth embodiment, in association with each optical output port (or a collimator which couples to each input/output port), photoreceptor element pairs 481 through 48$m$, each composed of two photoreceptor elements arranged in the direction along the arrangement of the collimators 2, are arranged equal in number (m wavelengths) of switchable (accommodated in the optical switch) wavelength channels. However, according to the present invention, as a monitoring unit 58, multiple photoreceptor element groups 581 through 58$m$, each composed of three photoreceptor elements which are arranged as shown in the above-described FIG. 12($a$) and FIG. 12($b$), can be provided in parallel with the arrangement of the collimators 2.

For example, like the monitoring unit 58 shown in FIG. 17, switchable (accommodated in the optical switch) photoreceptor element groups 581 through 58$m$ equal in number (m wavelengths) to the wavelength channels can be provided, or as a modified example, the optical output port-number of photoreceptor element groups 581 through 58$m$ cab be provided. In this instance, the number of photoreceptor elements composing each group and their arrangement should by no means be limited to the case of FIG. 17, and it is possible, as appropriate, to change the number of photoreceptor elements arranged in parallel with the X axis into not smaller than three, for example.

In this case, also, to detect optical current corresponding to light received by the photoreceptor element groups 581 through 58$n$, multiple optical current detecting circuits and AD converters can be equal in number to the number of photoreceptor elements, as in the case of the second and the fourth embodiment. In this instance, the other construction is made to be the similar to the embodiment of the above-described FIG. 12($a$) and FIG. 12($b$).

Figure 18:
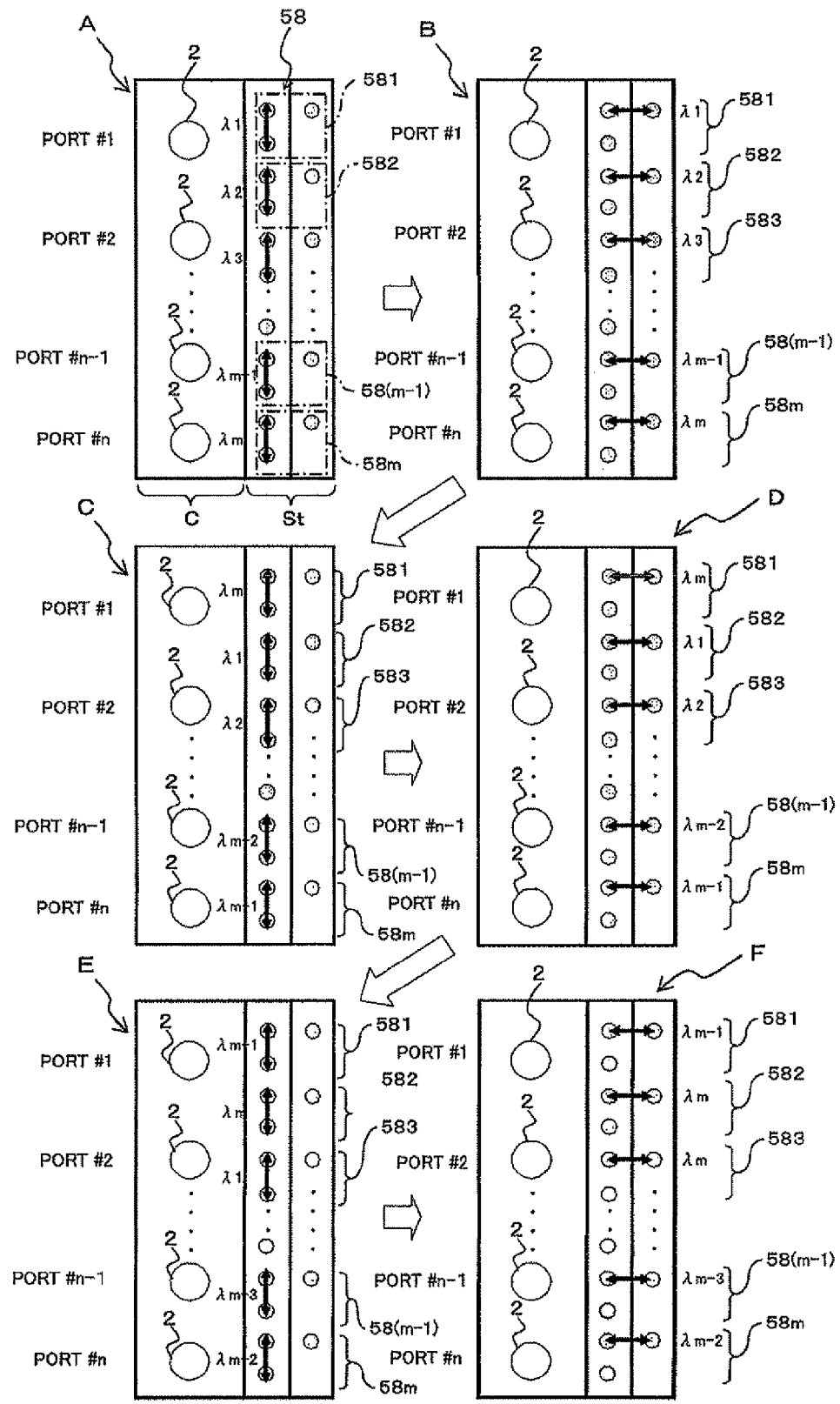
FIG. 18 is a diagram for describing an operation of the fifth embodiment.
Figure 19:
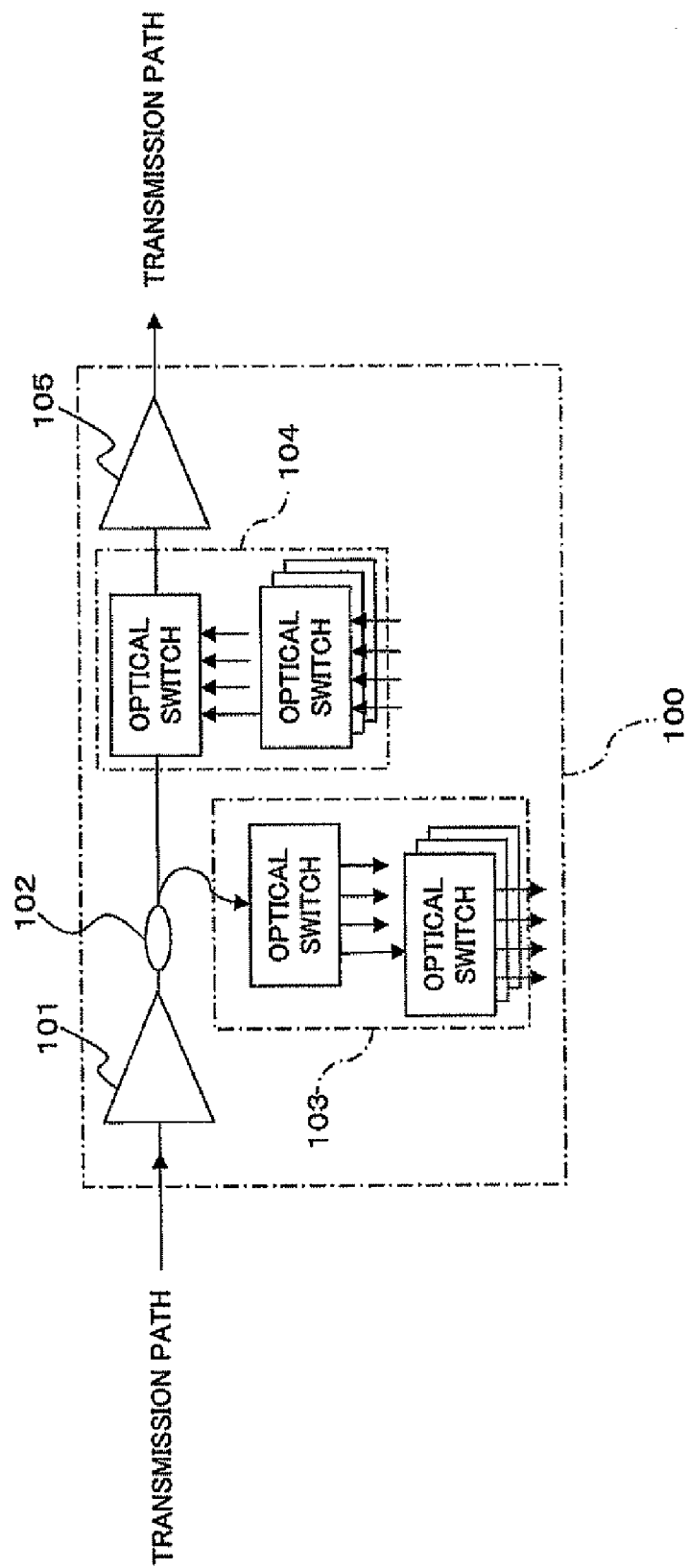
FIG. 19 is a diagram showing previous technology.
Figure 20:
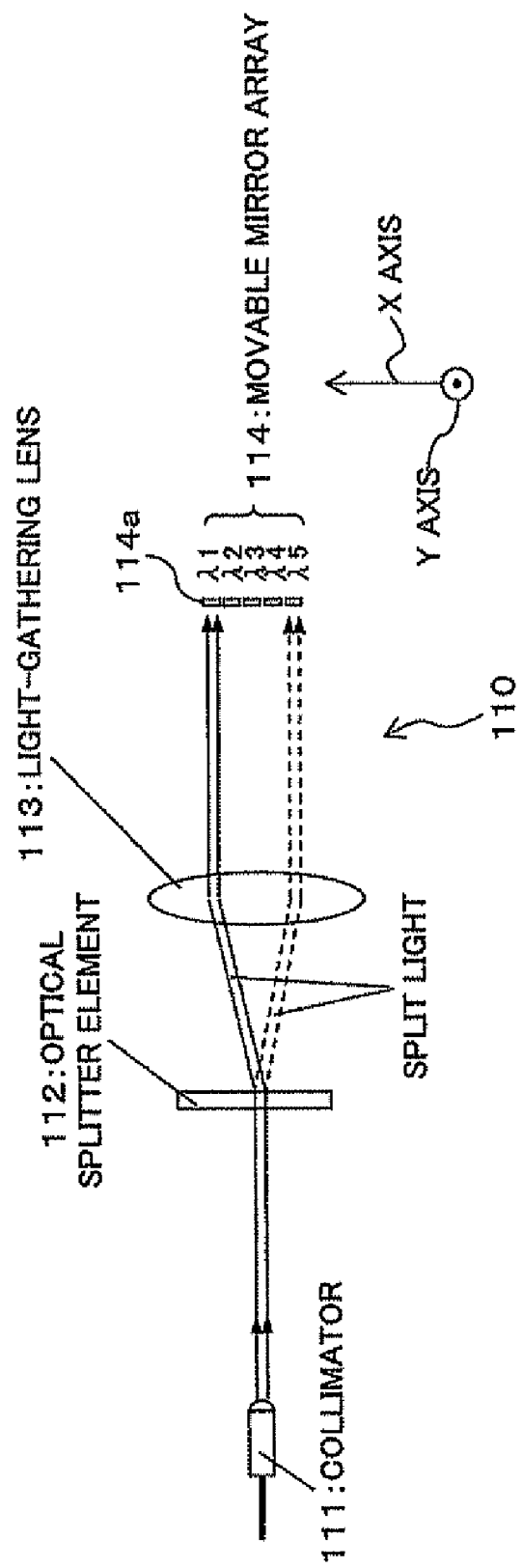
FIG. 20 is a diagram showing previous technology.
Figure 21:
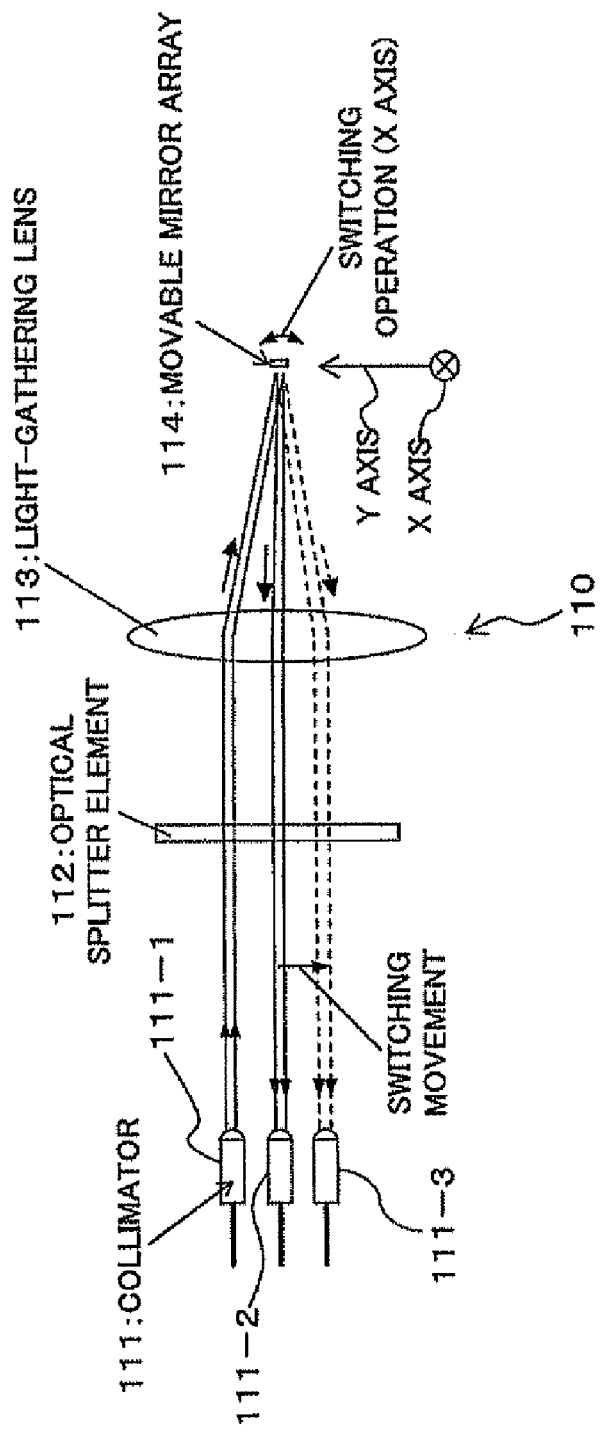
FIG. 21 is a diagram showing previous technology.

As a result, as shown as S1 and S2 of FIG. 18, for example, reflection surface angles of the mirror 6a are set so that the photoreceptor element groups 581 through 58$m$ receive light of wavelengths $\lambda 1$ through $\lambda m$, respectively. On the other hand, as in the case of the embodiment of the above-described FIG. 12, reference activating voltages Vx(1) through Vx(m) in a case (A) where the mirror 6a are rotated with respect to the X axis are obtained, and the reference activating voltages Vy(1) through Vy(m) of a case (B) where the mirror 6a are rotated with respect to the Y axis are obtained. In this manner, the operation states of the mirror 6a reflecting wavelength channels are simultaneously supervised.

Further, as in the case of the fourth embodiment, if wavelength channels input to the photoreceptor element groups 581 through 58$m$ are fixed, relatively large load is applied to a mirror 6a of a certain wavelength channel whose rotation angle is made to be relatively large. Thus, the association between the wavelength channel to be supervised at a predetermined cycle and the photoreceptor element groups 581 through 58m are switched by rotation.

More precisely, following monitoring by A and B of FIG. 18, as shown in C and D in FIG. 18, the wavelength channels to be monitored using the photoreceptor element groups 581 through 58m are given as wavelengths λm, λ1 through λm-1, and wavelength channels to be supervised using the photoreceptor element groups 581 through 58m shifted by one wavelength channel. In addition, as shown E and F in FIG. 18, the wavelength channels to be supervised using the photoreceptor element groups 581 through 58m are given as wavelengths λm-1, λm, and λ1 through λm-2. After then on, wavelength channels are sequentially shifted one by one.

Consequently, according to the fifth embodiment, advantages similar to those of the second embodiment are realized, and in addition, since photoreceptor element groups 581 through 58m are provided equal in number to switchable wavelength channels (m wavelengths), it becomes possible to always supervise disorder of all the standby channels, so that it is possible to improve the reliability of disorder detection. Further, since it is possible to supervise the movement state of mirror 6a with respect to the Y axis, the monitoring accuracy in real time is more improved.

In this instance, as a construction for supervising the operation state of the mirror 6a for all the wavelength channels in rotation direction with respect to the X axis and the Y axis, in addition to the construction of the above-described fifth embodiment, a construction is also applicable in which photoreceptor elements arranged in the shutter movement region St in two receptor element rows in parallel with the collimators 2, and in one row, at least (the number of wavelength channels+1)–number of photoreceptor elements are arranged. In this case, monitoring of each wavelength channel is sequentially performed, and light of the adjacent wavelength channel is saved. Then, at rotation of association between the wavelength channels to be supervised and photoreceptor elements are supervised by shifting allocation by one step along the arrangement direction of the collimators 2.

[F] Others

Without being limited to the above-described embodiments, various changes or modifications may be suggested without departing from the gist of the invention.

For example, by means of using an optical current detection value from photoreceptor elements arranged in the shutter movement region St as described in the above embodiments, it is possible to detect input to the optical ports and input channels. More precisely, in the construction of the optical switch 1 according to the first embodiment, when the control/compare calculating unit 9d detects an optical current of the level corresponding to the input signal light based on the optical current from the AD converter 9b, it is possible to detect a wavelength at which optical coupling to the optical output pot is made OFF, that is, the input signal light of the wavelength whose optical coupling to the optical output port, that is, to detect input of a signal light in standby of the wavelength, and then to notify the upper system of such.

Generally speaking, at the time an optical switch is initially installed to an optical communication system, only a small number of optical ports are used, and as traffics increase or service increases, optical ports coming in service are added. Accordingly, when a new service signal is added to a standby port, the system needs to automatically detect the input and to realize the target transmission.

Thus, in the construction in which photoreceptor elements 81 through 85 whose number corresponds to the number of optical ports as shown in FIG. 14, a control/compare calculating unit (see reference character 39d in FIG. 8), for example, supervises the presence or the absence of input to an optical port of the standby wavelength channel. In this instance, to make it possible to detect the presence or the absence of input, even when a signal light of a standby wavelength channel is input from any of the optical ports, with respect to a path of port connection of a detected port, the mirror 6a is moved at an appropriate cycle, thereby performing polling detection.

At that time, if optical input is detected, the control/compare calculating unit specifies an optical port to which input is performed based on a movable mirror movement angle and the position of the detected photoreceptor element, and it is notified to the upper system. As a result, the usefulness as an optical switch is improved.

Further, in accordance with a construction having photoreceptor element groups 481 through 48m corresponding to the number m of switchable wavelength channels as shown in FIG. 15 (wavelength channels which can be accommodated in the optical switch), it is possible to detect an input wavelength channel simultaneously with input detection to an optical input port which is not used.

The disclosure of the above embodiments makes it possible for the ordinarily skilled in the art to manufacture the apparatus of the present invention.

What is claimed is:

1. An optical switch adapted to switch a light beam from m (m is a natural number) optical input port to n (n is a natural number) optical output port(s) by the unit of wavelength, said optical switch comprising:

a collimator which outputs a collimated light beam by collimating the light beam from the optical input port;

an optical splitter which outputs dispersed light beams by dispersing the collimated light beam;

a lens which outputs focused light beams by focusing the dispersed light beams;

mirrors which individually have a rotatable reflection face and which output reflected light beams to the output port(s) via said lens, said optical splitter and said collimator by individually reflecting the focused light beams;

a controller which controls each angle of the reflection faces to switch ON/OFF of an optical coupling of the reflected light beams to the optical output port(s); and a monitor which monitors the reflected light beam under a condition of the optical coupling to the optical output port being in an OFF state, wherein each of said mirrors has a plurality of rotation axes, wherein said controller controls an angle of a first axis of the mirror to switch ON/OFF of the optical coupling of the reflected light beam to the optical output port, and said controller controls an angle of a second axis of the mirror to switch the reflected light beam to the optical output port, and wherein said controller includes:

a driver which changes the angles of said first axis and said second axis such that a locus of the reflected light beam under the condition of the optical coupling to the optical output port being in the OFF state moves cyclically; and a supervisor which detects whether the mirror operates correctly, based on an amplitude or a frequency of variation, which is caused by an operation of the driver, in light amount of the reflected light beam which is monitored by the monitor.

2. An optical switch as set forth in claim 1,
wherein if the controller switches OFF a plurality of the reflected light beams having different wavelengths, the driver changes the angles of the first axes and the second axes of the mirrors which outputs the plurality of the reflected light beams, and the supervisor detects whether the mirror operates correctly, one at each time.

3. An optical switch as set forth in claim 1, wherein said monitor includes a plurality of photodiodes arranged in parallel with said optical output port(s).

4. An optical switch as set forth in claim 3, wherein if the controller switches OFF a plurality of the reflected light beams having different wavelengths, the plurality of the reflected light beams having different wavelengths are associated one with each of the plurality of photodiodes;
the driver and the supervisor changes the association.

5. An optical switch as set forth in claim 1, wherein the number of photodiodes which are arranged in parallel with said optical output port(s) and which are included in the monitor corresponds to the number of the optical output ports.

6. An optical switch as set forth in claim 1, wherein the number of photodiodes which are arranged in parallel with said optical output port(s) and which are included in the monitor corresponds to the number of wavelengths included in the light beam.

7. An optical switch adapted to switch a light beam from m (m is a natural number) optical input port to n (n is a natural number) optical output port(s) by the unit of wavelength, said optical switch comprising:
a collimator which outputs a collimated light beam by collimating the light beam from the optical input port;
an optical splitter which outputs dispersed light beams by dispersing the collimated light beam;
a lens which outputs focused light beams by focusing the dispersed light beams;
mirrors which individually have a rotatable reflection face and which output reflected light beams to the output port(s) via said lens, said optical splitter and said collimator by individually reflecting the focused light beams;
a controller which controls each angle of the reflection faces to switch ON/OFF of an optical coupling of the reflected light beams to the optical output port(s); and
a monitor which monitors the reflected light beam under a condition of the optical coupling to the optical output port being in an OFF state,
wherein each of said mirrors has a plurality of rotation axes,
wherein said controller controls an angle of a first axis of the mirror to switch ON/OFF of the optical coupling of the reflected light beam to the optical output port, and said controller controls an angle of a second axis of the mirror to switch the reflected light beam to the optical output port, and
wherein said controller includes: a driver which changes the angles of said first axis and said second axis such that a locus of the reflected light beam under the condition of the optical coupling to the output port being in the OFF state is moved; and
wherein said monitor includes at least one pair of two photodiodes arranged such that the reflected light beam is detected by both of the photodiodes when the locus of the reflected light beam moves between the photodiodes;
wherein said controller includes a supervisor, which gets a control amount of said controller for obtaining the angles of the first axis and the second axis at the time the reflected light beam is detected by both of the photodiodes on the basis of a signal corresponding to the light amount of the reflected light beam received by the pair of photodiodes, gets a detection result of the reflected light beam from the monitor, and which detects whether the mirror operates correctly based on the control amount and the detection result.

8. An optical switch as set forth in claim 7, wherein the plurality of pairs of two photodiodes are arranged in parallel with the optical output port(s).

9. An optical switch as set forth in claim 8, wherein if the controller switches OFF a plurality of the reflected light beams having different wavelengths, the plurality of the reflected light beams having different wavelengths are associated one with each of the plurality of photodiodes;
the driver and the supervisor changes the association.

10. An optical switch as set forth in claim 7, wherein the plurality of pairs of two photodiodes are arranged in parallel with the optical output port(s), and the number of the pairs of two photodiodes corresponds to the number of optical output ports.

11. An optical switch as set forth in claim 7, wherein a plurality of pairs of two photodiodes are arranged in parallel with the optical output port(s), and the number of the pairs of two photodiodes corresponds to the number of wavelengths said optical switch capable to switch.

12. An optical switch adapted to switch a light beam from m (m is a natural number) optical input port to n (n is a natural number) optical output port(s) by the unit of wavelength, said optical switch comprising:
a collimator which outputs a collimated light beam by collimating the light beam from the optical input port;
an optical splitter which outputs dispersed light beams by dispersing the collimated light beam;
a lens which outputs focused light beams by focusing the dispersed light beams;
mirrors which individually have a rotatable reflection face and which output reflected light beams to the output port(s) via said lens, said optical splitter and said collimator by individually reflecting the focused light beams;
a controller which controls each angle of the reflection faces to switch ON/OFF of an optical coupling of the reflected light beams to the optical output port(s); and
a monitor which monitors the reflected light beam under a condition of the optical coupling to the optical output port being in an OFF state,
wherein each of said mirrors has a plurality of rotation axes,
wherein said controller controls an angle of a first axis of the mirror to switch ON/OFF of the optical coupling of the reflected light beam to the optical output port, and said controller controls an angle of a second axis of the mirror to switch the reflected light beam to the optical output port, and
wherein said controller includes a driver which individually changes the angles of the first axis and the second axis such that a locus of the reflected light beam under the condition of the optical coupling to the optical output port being in the OFF state is moved in at least two different directions,
wherein said monitor includes at least one group of at least three photodiodes arranged such that the reflected light beam is detected by both of adjacent photodiodes in each of the at least two different directions when the locus of the reflected light beam moves between the adjacent photodiodes, and
wherein said supervisor gets a control amount of said controller for obtaining the angles of the first axis and the second axis at the time the reflected light beam is detected by both of adjacent photodiodes on the basis of a signal corresponding to the light amount of the reflected light beam received by the group of photodiodes, gets a detection result of the reflected light beam from the monitor, and individually detects whether the mirror operates correctly based on the control amount and the detection result, on the basis of control amount of said controller for obtaining the light beam position by controlling the angle of the mirror.

13. An optical switch as set forth in claim 12, wherein the plurality of groups of at least three photodiodes are arranged in parallel with said optical output port(s).

14. An optical switch as set forth in claim 12, wherein the plurality of groups of at least three photodiodes are arranged in parallel with said optical output port(s), and the number of the groups of at least three photodiodes corresponds to the number of said optical output ports.

15. An optical switch as set forth in claim 12, wherein the plurality of groups of at least three photodiodes are arranged in parallel with said optical output port(s), and the number of the groups of at least three photodiodes corresponds to the number of wavelengths included in the light beam.

* * * * *